US012577967B2

(12) United States Patent
Pedersen et al.

(10) Patent No.: US 12,577,967 B2
(45) Date of Patent: Mar. 17, 2026

(54) MODULAR SUBSEA MANIFOLD SYSTEM

(71) Applicant: ONESUBSEA AS, Lysaker (NO)

(72) Inventors: Martin Pedersen, Oslo (NO); Viktor Grennberg, Oslo (NO); Morten Rengman Moerck, Oslo (NO); Ernst Cederstroem, Linkoeping (SE); Rolf Barfod Schueller, Droebak (NO); Martin Helgen, Lommedalen (NO); Marcelo Maldaner, Curitiba Parana (BR); Swapnil Pasalkar, Pune (IN); Brynjulf Spalder, Asker (NO); Shelly Holmesland, Nesbru (NO)

(73) Assignee: ONESUBSEA AS, Lysaker (NO)

( * ) Notice: Subject to any disclaimer, the term of this patent is extended or adjusted under 35 U.S.C. 154(b) by 722 days.

(21) Appl. No.: 17/913,835

(22) PCT Filed: Mar. 23, 2021

(86) PCT No.: PCT/NO2021/050076
§ 371 (c)(1),
(2) Date: Sep. 23, 2022

(87) PCT Pub. No.: WO2021/194350
PCT Pub. Date: Sep. 30, 2021

(65) Prior Publication Data

US 2024/0218888 A1 Jul. 4, 2024

(30) Foreign Application Priority Data

Mar. 23, 2020 (GB) ..................................... 2004159

(51) Int. Cl.
*F15B 13/08* (2006.01)
*E21B 43/017* (2006.01)

(52) U.S. Cl.
CPC ...... *F15B 13/0817* (2013.01); *E21B 43/0175* (2020.05)

(58) Field of Classification Search
CPC ............. F15B 13/0817; E21B 43/0175; E21B 43/0017
See application file for complete search history.

(56) References Cited

U.S. PATENT DOCUMENTS 6,468,481 B1 * 10/2002 Anderson ............... B01F 21/20 422/281
6,779,539 B1 * 8/2004 Schwamberger ....... B01F 21/22 137/563

(Continued)

FOREIGN PATENT DOCUMENTS

WO WO 2019/063311 4/2019
WO WO 2019/115383 A1 6/2019
WO WO 2019/125174 A1 6/2019

*Primary Examiner* — Patrick C Williams
(74) *Attorney, Agent, or Firm* — Jeffrey D. Frantz

(57) ABSTRACT

A modular manifold system for connection to a header pipe. The modular manifold system includes a central hub which has a header pipe connection, a conduit connection arrangement arranged on the central hub, and a module connection arrangement arranged on the central hub. The header pipe connection defines a flow port which permits a fluid communication between the header pipe and the central hub. The conduit connection arrangement has a conduit connected thereto and defines a flow port which permits a fluid communication between the central hub and the conduit connected to conduit connection arrangement. The module connection arrangement defines a flow port which permits a fluid communication between the central hub and a connected module.

24 Claims, 9 Drawing Sheets

(56) References Cited

U.S. PATENT DOCUMENTS

| | | | | |
|---|---|---|---|---|
| 2014/0286716 | A1* | 9/2014 | Cochrum | B65G 53/36 406/122 |
| 2015/0053292 | A1* | 2/2015 | Hall | B65D 88/30 137/899.3 |
| 2018/0030794 | A1* | 2/2018 | Ellis | E21B 21/01 |
| 2018/0031146 | A1 | 2/2018 | Pinho et al. | |
| 2019/0120020 | A1 | 4/2019 | Rageot et al. | |
| 2019/0323325 | A1 | 10/2019 | Hestetun et al. | |
| 2020/0248724 | A1 | 8/2020 | Mollan et al. | |
| 2020/0318759 | A1 | 10/2020 | Ilstad et al. | |
| 2021/0079763 | A1 | 3/2021 | Ali et al. | |

* cited by examiner

MODULAR SUBSEA MANIFOLD SYSTEM

CROSS REFERENCE TO PRIOR APPLICATIONS

This application is a U.S. National Phase application under 35 U.S.C. § 371 of International Application No. PCT/NO2021/050076, filed on Mar. 23, 2021 and which claims benefit to Great Britain Patent Application No. 2004159.6, filed on Mar. 23, 2020. The International Application was published in English on Sep. 30, 2021 as WO 2021/194350 A1 under PCT Article 21(2).

FIELD

The present invention relates to a modular subsea manifold system for connection to a header pipe.

BACKGROUND

Manifolds are used in subsea oil and gas production for comingling and/or distribution of flow between one main bore and one or more branches/flow paths, such as pipelines or fluid conduits. For example, a manifold may be used when comingling the flow of several hydrocarbon production wells into one common pipeline, or when distributing injection medium from one pipeline into several wells and/or or other locations throughout a system of pipework.

In systems such as subsea pipework systems, the main bore is typically referred to as the "header". The header can include, for example, a system for the connection of pipelines at one or both ends, and may be an integral part of the pipeline. The header may also include one or more valves for controlling a flow of fluid therethrough.

The connection of several manifolds to a single pipeline is common. As such, a header may be designed (e.g., dimensioned) to account for more flow than the branches/flow paths in one specific manifold alone may account for. In traditional manifold design, there may exist tie-in points for several branches, all aligned in the same direction, going back to a header (e.g., a horizontally oriented header). This design may mean that each of the branches are unique, and/or that each of the branches must be tailored to the requirements of each specific manifold. This may therefore increase the cost involved and may make standardization difficult.

SUMMARY

In an embodiment, the present invention provides a modular manifold system for connection to a header pipe. The modular manifold system includes a central hub comprising a header pipe connection, a conduit connection arrangement arranged on the central hub, and a module connection arrangement arranged on the central hub. The header pipe connection defines a flow port which permits a fluid communication between the header pipe and the central hub. The conduit connection arrangement is configured to have a conduit be connected thereto and defines a flow port which permits a fluid communication between the central hub and the conduit connected to conduit connection arrangement. The module connection arrangement defines a flow port which permits a fluid communication between the central hub and a connected module.

BRIEF DESCRIPTION OF THE DRAWINGS

The present invention is described in greater detail below on the basis of embodiments and of the drawings in which.

DETAILED DESCRIPTION

Figure 2:
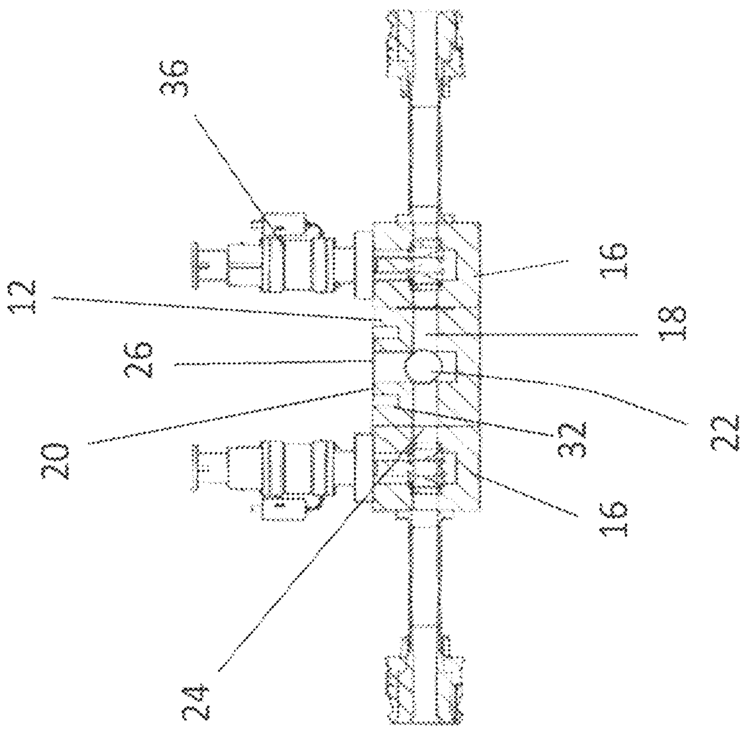
FIG. 2 shows the example of a modular subsea manifold system of FIG. 1 in a sectional view.

The present disclosure will become apparent from the detailed description given below. The detailed description and specific examples disclose preferred examples of the disclosure by way of illustration only. Those skilled in the art understand from guidance in the detailed description that changes and modifications may be made within the scope of the disclosure.

Hence, it is to be understood that the disclosure herein is not limited to the particular component parts of the device described or steps of the methods described since such device and method may vary. It is also to be understood that the terminology used herein is for the purpose of describing particular embodiments only, and is not intended to be limiting. It should be noted that, as used in the specification and the appended claims, the articles "a", "an", "the", and "said" are intended to mean that there are one or more of such elements unless the context explicitly dictates otherwise. Thus, for example, reference to "a unit" or "the unit" may include several devices, and the like. Furthermore, the words "comprising", "including", "containing" and similar wordings do not exclude other elements or steps.

One example described herein relates to a modular manifold system for connection to a header pipe, the manifold system comprising:

- a central hub comprising a header pipe connection, the header pipe connection defining a flow port permitting fluid communication between a header pipe and the central hub;
- a conduit connection arrangement located on the central hub, for connection of a conduit thereto and defining a flow port permitting fluid communication between the central hub and a connected conduit; and a module connection arrangement located on the central hub, the module connection arrangement defining a flow port permitting fluid communication between the central hub and a connected module.

A second example relates to a modular manifold configurable to be connected to a header pipe such that the module connection arrangement is located above the conduit connection arrangement. The module connection arrangement may be positioned so as to permit a module to be mounted or stacked upon the central hub. As such, the addition of a module, or modules to the modular manifold system may have the effect of expanding the modular manifold system in a vertical direction, thereby conserving space in the offshore location in which the modular manifold system is positioned (e.g., on the seabed).

A third example relates to a modular manifold system comprising a module connected to the module connection arrangement, and wherein a component of the weight of the module acts in the direction of the module connection arrangement.

A fourth example relates to a modular manifold system, wherein the connected module comprises a further conduit connection arrangement in fluid communication with the flow port of the module connection arrangement.

A fifth example relates to a modular manifold system, wherein the connected module comprises a plurality of further conduit connection arrangements, having an even circumferential spacing about a center of the connected module.

A sixth example relates to a modular manifold system, wherein the central hub comprises two header pipe connections, at least one of which is configurable as a fluid inlet, and one of which configurable as a fluid outlet. The central hub may additionally or alternatively comprise a first header pipe connection to a first header pipe, and a second header pipe connection to a second header pipe. Flow from the first header pipe connection may be able to be mixed with flow from a second header pipe connection in the central hub. In some examples, the central hub, the first and second header pipe connection and/or the first and second header pipe may comprise an isolation valve, thereby permitting flow between the central hub and the first and second header pipe to be selectively isolated. For example, the flow may be isolated between the central hub and the first header pipe, while flow between the central hub and the second header pipe is permitted.

A seventh example relates to a modular manifold system, wherein the central hub comprises at least two conduit connection arrangements.

An eighth example relates to a modular manifold system, wherein the at least two conduit connection arrangements have an even circumferential spacing about a center of the connected module.

A ninth example relates to a modular manifold system, wherein the at least two connection arrangements are circumferentially spaced 180 degrees from one another.

A tenth example relates to a modular manifold system, wherein the connected module and the central hub define a central axis extending therethrough, and the with the axis of the flow port of the module connection point being parallel to the central axis, and the axis of the flow port of the conduit connection point being at right angles to the central axis.

An eleventh example relates to a modular manifold system, wherein the connected module comprises four circumferentially evenly spaced further conduit connection arrangements about the central axis, and the central hub comprises two circumferentially evenly spaced conduit connection arrangements about the central axis, and at least one of the further conduit connection arrangements is offset by 45 degrees relative to at least one of the connection arrangements.

A twelfth example relates to a modular manifold system, wherein the central hub comprises a body comprised of multiple components.

A thirteenth example relates to a modular manifold system, wherein the header pipe connection comprises a header valve for controlling fluid flow therethrough, and the conduit connection arrangement comprises a conduit valve for controlling fluid flow therethrough.

A fourteenth example relates to a modular manifold system, comprising a module connected to the module connection arrangement, the module comprising a further conduit connection arrangement, and wherein the further conduit connection arrangement comprises a module valve for controlling fluid flow therethrough.

A fifteenth example relates to a modular manifold system, wherein each of the header valve, the conduit valve and the module valve comprise an actuator arrangement, each of the actuator arrangements extendable from the respective valve, and towards an actuator plane.

A sixteenth example relates to a modular manifold system, wherein each of the actuator arrangements are telescopically extendable towards the actuator plane.

A seventeenth example relates to a modular manifold system, comprising a valve control arrangement, having an interface with the actuator arrangements, at least part of which interface lies in the actuator plane.

A second aspect relating to the described examples relates to a method for installing a modular manifold system on a header pipe, comprising:

- providing a header pipe for connection of the manifold system thereto;
- providing a modular manifold system comprising a central hub, the central hub comprising:
  - a header pipe connection for connection to the manifold connection point of the header pipe;
  - a conduit connection arrangement for connection of a conduit thereto, and defining a flow port permitting fluid communication between the central hub and a connected conduit;
  - a module connection arrangement, the module connection point defining a flow port permitting fluid communication between the central hub and a connected module;
- connecting a header pipe to the header pipe connection of the modular manifold system; and
- orienting the modular manifold system such that the module connection arrangement is located above the conduit connection arrangement.

A second example relating to the second described aspect relates to a method for installing a modular manifold system according to the second aspect, comprising connecting a module to the central hub, such that a component of the weight of the module acts on the central hub.

A third example relating to the second described aspect relates to a method for installing a modular manifold system according to the second aspect and/or the second example thereof, comprising controlling fluid flow through the conduit connection arrangement and the header pipe arrangement via a valve control arrangement.

A third aspect relating to the described examples is of a subsea conduit, comprising:

- a plurality of modules distributed therealong, each module comprising:

a valve therein and a valve actuation arrangement;
a fluid port; and
a connection arrangement for connection of a secondary component thereto, wherein the secondary component is configurable to receive a fluid flow from the fluid port, and the valve is operable to selectively restrict fluid flow through at least one of the subsea conduit and the fluid port.

A second example relating to the third described aspect relates to a subsea conduit wherein the height of each of the plurality of modules is between one and four times the diameter of the subsea conduit.

A third example relating the third described aspect relates to a subsea conduit, wherein the valve is configurable between an open position in which flow is permitted through both the fluid port and the subsea conduit, and a closed position in which fluid flow though the subsea conduit is permitted and fluid flow via the fluid port is restricted.

A fourth example relating the third described aspect relates to a subsea conduit, wherein the valve is configurable to an intermediate position, in which position fluid flow through the subsea conduit is restricted, and fluid flow is diverted from the subsea conduit and through the fluid port.

A fifth example relating the third described aspect relates to a subsea conduit, wherein in the intermediate position, the valve diverts substantially all fluid flow from the subsea conduit and through the fluid port.

A sixth example relating to the third described aspect relates to a subsea conduit, wherein the plurality of modules is evenly distributed along the subsea conduit.

A seventh example relating to the third described aspect relates to a subsea conduit, wherein the subsea conduit is for transport of hydrocarbon fluids.

An eighth example relating to the third described aspect relates to a subsea conduit, wherein the secondary component is connected to a first of the plurality of modules and a second of the plurality of modules.

A ninth example relating to the third described aspect relates to a subsea conduit, configurable to permit a flow of fluid from a first of the plurality of modules to a second of the plurality of modules via the secondary component.

A tenth example relating to the third described aspect relates to a subsea conduit, wherein the secondary component comprises a fluid treatment arrangement.

An eleventh example relating to the third described aspect relates to a subsea conduit, wherein each of the plurality of modules is a modular manifold system according to the first described aspect.

A fourth aspect relating to the described examples relates to a method for diverting a flow of fluid from a subsea conduit, comprising:

providing a subsea conduit having a plurality of modules distributed therealong, each module comprising:
a valve therein and a valve actuation arrangement;
a fluid port; and
a connection arrangement for connection of a secondary component thereto;

connecting a flow diversion arrangement to a first and a second of the plurality of modules via the connection arrangement;

configuring the valve, using the valve actuation arrangement, to permit fluid flow through the fluid port on each of the first and second of the plurality of modules; and flowing a fluid from the first of the plurality of modules to the second of the plurality of modules via the flow diversion arrangement.

A second example relating to the fourth described aspect relates to a method wherein the valve is configurable between a closed position, in which fluid flow through the fluid port is restricted, and an intermediate position in which fluid flow through the fluid port is permitted, and fluid flow through the subsea conduit is restricted.

A third example relating to the fourth described aspect relates to a method wherein the flow diversion arrangement comprises a fluid testing arrangement.

A fourth example relating to the fourth described aspect relates to a method wherein the flow diversion arrangement comprises a fluid treatment arrangement.

A fifth example relating to the fourth described aspect relates to a method wherein the flow diversion arrangement comprises a fluid pump.

The above objects, as well as additional objects, features and advantages of the present disclosure, will be more fully appreciated by reference to the following illustrative and non-limiting detailed description of example embodiments of the present disclosure, when taken in conjunction with the accompanying drawings.

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
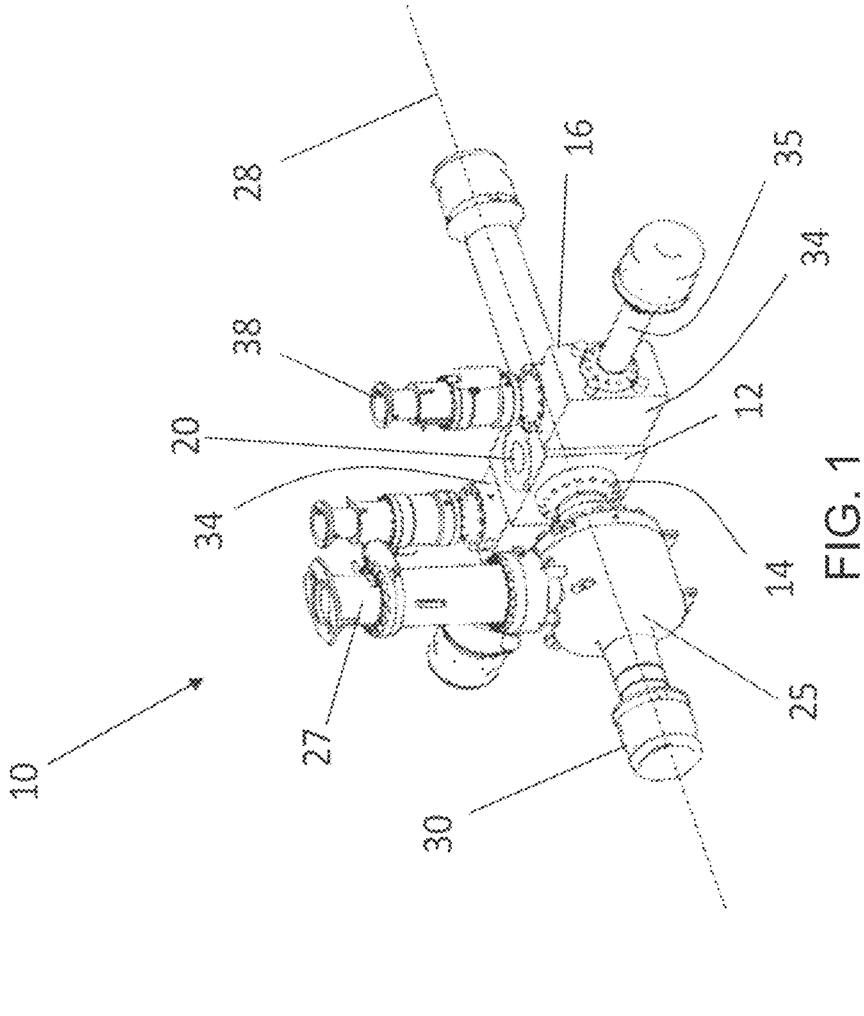
FIG. 1 shows an example of a modular subsea manifold system in an isometric view.

Illustrated in FIG. 1 is an example of a modular subsea manifold system 10. As depicted in this example, the modular subsea manifold system may comprise a central hub 12, a header pipe connection 14 which may be or comprise a header communication means, at least one conduit connection arrangement 16 (although in this example, two conduit connection arrangements 16 are shown) which may be or comprise a manifold interface communication means, and a module connection arrangement 20 which may be or comprise a module communication means.

The header communication means may comprise the header pipe connection 14, and may comprise any additional features necessary for enabling fluid communication between the central hub 12 and a header pipe as will be described in the following paragraphs. For example, the header communication means may comprise a connection means such as a bolted or threaded connection means, and a flow port (for example, the connection means may be located around the periphery of the flow port). The manifold interface communication means may comprise the conduit connection arrangement 16 and any additional features necessary for enabling fluid communication with a manifold interface, such as a conduit and associated connection means (e.g., a bolted connection, a threaded connection etc.), a fluid port and in some examples may comprise a valve situated between the central hub 12 and a manifold interface. The module communication means may comprise the module connection arrangement 20 and any additional features necessary for enabling fluid communication between a module and the central hub 12, for example, a threaded, a bolted, a stab-in connection means, a fluid port and the like.

The central hub 12 may comprise a body, or a housing, comprising of a single component. In the examples shown in FIGS. 1 and 2, the central hub 12 comprises a single component. In other examples, the central hub 12 may comprise a housing comprising or defined by a plurality of components, such as two components. Such a plurality of components may be attached in any appropriate way, for example, by bolting, welding, chemical bonding, or the like.

The central hub 12 may also define a flow path 18. Dependent on the geometry of the central hub 12, the flow path 18 may extend between at least two of the header pipe connections 14, the conduit connection arrangement 16, the module connection arrangement 20, or all three thereof. As shown in the example of FIGS. 1 and 2, the central hub 12 defines a flow path 18 extending between all three of the header pipe connection 14, the conduit connection arrangement 16, and the module connection arrangement 20. The flow path 18 may be considered to comprise two separate flow paths; a manifold flow path that extends from the header pipe connection 14 (e.g., the header communication means) and the conduit connection arrangement or the manifold interface communication means, and a module flow path, which extends from the header pipe connection 14 and the module communication means.

The flow path 18 may comprise or define a header flow port 22 at the header pipe connection 14, may comprise or define a conduit flow port 24 which may also form part of the conduit connection arrangement 16, and may comprise or define a module flow port 26. In the example shown, the central hub 12 has the shape of a rectangular prism, although the skilled reader would appreciate that other shapes of central hub 12 may be possible, for example, other shapes of prism.

Included for case of reference, FIG. 1 includes a header axis 28, which extends in line with the axis of a header pipe 30, and through the central hub 12. As shown in FIG. 1, the header pipe 30 may connect to the central hub 12 at the header pipe connection 14. In this example, the header pipe 30 is connected to the header pipe connection 14 via a plurality of bolts or screws. However, other types of connection would be possible, such as a threaded connection. Additionally integrated into the header pipe is a header valve 25, which comprises an actuator 27 extending perpendicularly relative to the header pipe 30, and in an upward direction in this example.

As shown in FIGS. 1 and 2, the module connection arrangement 20 is positioned on a top surface of the central hub 12, and may be horizontally oriented. As such, it may be possible to land an additional module onto the module connection arrangement 20 once the central hub has been positioned in a subsea location, and may also be possible to subsequently disconnect and retrieve an additional module. Other examples of a module connection arrangement 20 may be possible. For example, the module connection arrangement may be oriented at an angle to the horizontal, or may be vertically oriented. The module connection arrangement 20 may be located on the central hub so that, when a module is connected thereto (not shown in FIG. 1 or 2), a component of the weight of the module may act in the direction of the central hub 12, and/or the module connection arrangement 20. As such, a connected module may be supported by the central hub 12, such that the module is effectively stacked upon the central hub 12.

One or multiple modules may be supported by the central hub 12. For example, a module may be itself able to be connected to a further module, such that the modules are able to be stacked one on top of the other (e.g., vertically stacked). Such stacking may more make more efficient use of available space, as a reduced are of the seabed is required to support the manifold system. In addition, each of the modules may be of a standard design, and may be simply stacked onto another module or central hub. As such, the modular manifold system may be expanded by addition additional modules as building blocks. The central hub and the modules may be of standard design, thereby reducing the cost associated with their production, as well as the complexity associated with their installation, as one single process is required in order to install further modules.

Any appropriate connection between a connected module and the module connection arrangement 20 may be possible. For example, the connection may be a stab-in type connection, or the module may be connected via a bolted or threaded connection. Where the module is stacked on the central hub 12 as described above, the weight of the module acting on the central hub 12 may assist in the connection thereof. To assist in the connection, the module connection arrangement 20 may provide a connection profile, or threaded holes for a bolted connection thereto. In some examples, the module connection arrangement 20 may simply comprise a fluid port. Illustrated in FIGS. 1 and 2 is a connection arrangement 32 comprising blind holes in the central hub 12, which may be used to bolt or screw a module to the central hub 12.

Extending in a lateral direction from the central hub 12, relative to the direction of the header axis 28, is a conduit valve arrangement 34. The conduit valve arrangement comprises a housing comprising a valve therein. The valve may be, for example, a ball valve, a butterfly valve, a gate valve, or the like. The valve is actuated by an actuator 36, which in this example extends from the conduit valve arrangement 34, as is described in more detail below.

The conduit valve arrangement 34 is located adjacent the conduit flow ports 24, and permits control of fluid flow through the conduit flow ports 24 in the central hub 12. In the example of FIGS. 1 and 2, the conduit valve arrangement 34 is illustrated as a separate component to the central hub, and may be connected by any appropriate connection, such as bolting, chemical bonding, welding or the like. However, the skilled person will appreciate that the conduit valve arrangement 34 may also be integrally formed with the central hub, such that it is a single component.

As illustrated, the subsea manifold system 10 comprises two conduit valve arrangements 34, corresponding to one for each conduit flow path 18. However, the skilled reader will appreciate that any number of conduit valve arrangements 34 may be possible, which may correspond to one conduit valve arrangement for each conduit flow path 18. In this example, the conduit valve arrangements 34 are evenly circumferentially spaced, such that they are located at approximately 180 degrees from one another, and at approximately 90 degrees from the header pipe 30. Such a spacing may facilitate connection of further conduits to a centralized location, while minimizing the risk of interference between adjacent conduits and the header pipe 30, for example.

Extending from the housing of the conduit valve arrangement 34 is the valve actuator 36. The valve actuator 36 may permit actuation of the valve of the conduit valve arrangement 34 by, for example, permitting turning or lifting of the valve. The valve actuator 36 may be able to be disconnected from the housing of the conduit valve arrangement 34, for example, for replacement of the valve actuator 36 or the valve. The valve actuator 36 may be connected to the valve actuator housing, for example, by screwing or bolting.

The valve actuator 36 may comprise an actuator extension mechanism 38, to permit the valve actuator 36 to be extended or contract, for example, extended or contracted so as to be coupled with an actuation device such as a robot, or other actuation device. The actuator extension mechanism 38 as shown in this example is a telescopic actuator extension mechanism, which comprises a connector section sildably engaged with a hollow cylinder so that translational movement, and optionally rotational movement, therein is possible.

The valve actuator 36 may extend from the valve arrangement 34 in a vertical direction, or a substantially vertical direction. In this example, the valve actuator 36 is positioned above the valve arrangement 34 and extends in an upward direction. The weight of the valve actuator 36 is supported by an upper surface of the valve arrangement 34; the example shows an upper surface of a housing of the valve actuator 36. The actuator extension mechanism 38 may permit linear extension of the valve actuator 36. The linear extension of the valve actuator 36 may be in the same direction from which the valve actuator 36 extends from the housing of the conduit valve arrangement 34. In one configuration, each of the actuator extension mechanisms 38 may extend so that a portion of the valve actuator 36 that is couplable to an actuation device lies in, or is substantially aligned with, an actuator plane. Such a configuration may enable an actuation device to be positioned so as to operate both valve actuators 36 without requiring repositioning of such a device. Further, the actuator 27 of the header valve 25 may comprise a similar actuator extension arrangement, thus also allowing coupling of the header actuator 27 to an actuation device lying in an actuator plane.

As shown in both FIGS. 1 and 2, extending radially from each actuator is a conduit 35. The conduit may comprise a connector arrangement, for connection to a further conduit, pipe, etc., and the conduit may be detachable from the valve arrangement 34 (or central hub 12, where the valve arrangement 34 is integrally formed with the central hub 12). The conduit being detachable may be advantageous, for example, if the manifold system 10 or central hub 12 requires transport. Equally, the header pipe 30 may comprise connector arrangements, for connection of a conduit thereto.

As illustrated in FIG. 1, the conduit 35 extends in a direction that is perpendicular to the header axis 28. The direction of the extension of the conduit 35 is substantially coplanar with that of the header axis 28, and the header pipe 30. While straight sections of conduit 35 are shown, it should be understood that alternative shaped sections (e.g., curved) may be possible.

Figure 4:
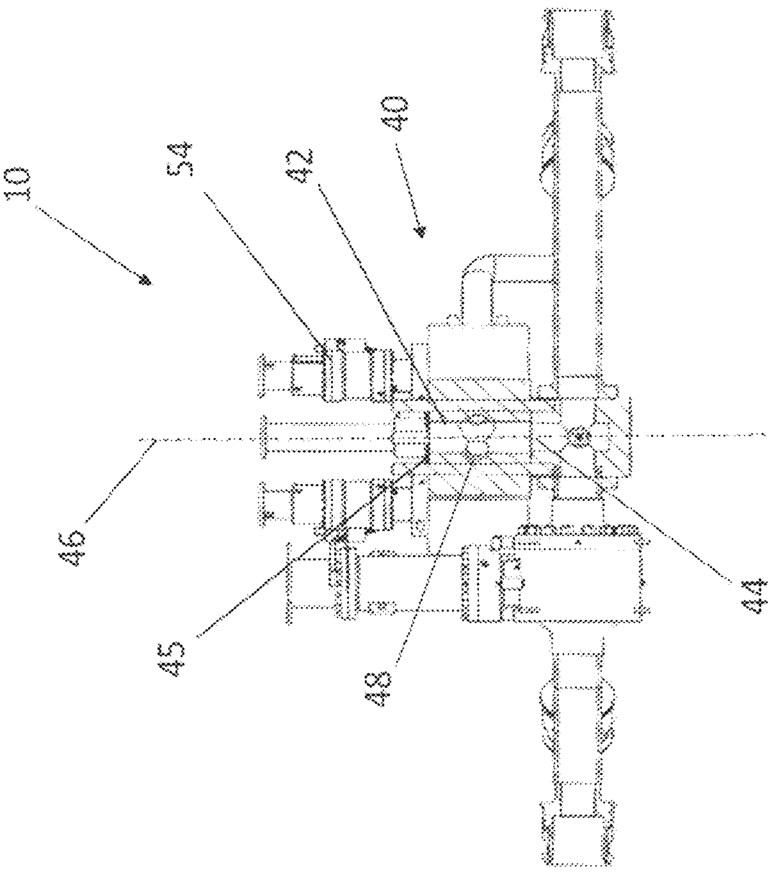
FIG. 4 shows a sectional view of the adapted version of the example of FIGS. 1 and 2.
Figure 3:
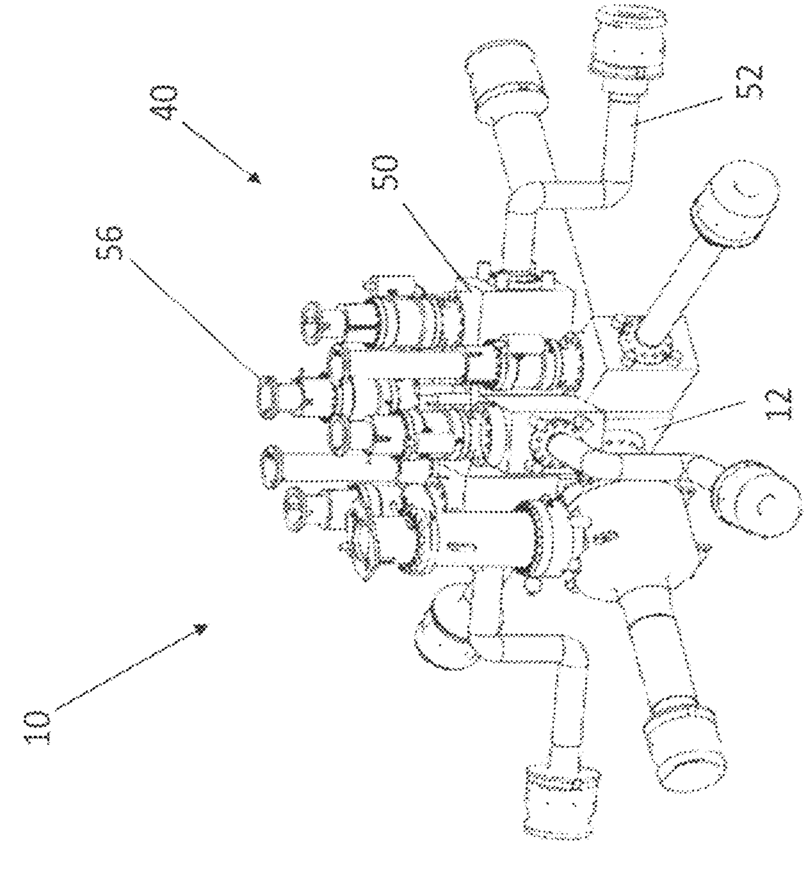
FIG. 3 shows an adapted version of the example of FIGS. 1 and 2.

Now referring to FIGS. 3 and 4, there is illustrated the manifold system 10 shown in FIGS. 1 and 2, but with an exemplary module 40 connected thereto. As the manifold system 10 is the same as that previously described, this description will not be repeated.

In this example, the module 40 is connected to the module connection arrangement (not shown at a position above the central hub 12) so that a component of the weight of the module 40 acts in the direction of the central hub 12. A major, or main, component of the weight of the module 40 may act on the central hub 12, or all of the weight of the module 40 may act on the central hub 12. Having at least some of the weight of the module 40 acting on the central hub 12 may assist to secure the module 40 to the central hub 12. In addition, having a larger portion of the weight of the module 40 acting on the central hub 12 may reduce forces acting in other directions, and may therefore reduce shear forces and shear stresses acting on components of the module connection arrangement.

As shown in FIG. 3, the module 40 comprises a central module 42 which defines a module inlet port 44. When the module 40 is connected to the central hub 12, the module inlet port 44 is positioned proximate, or in contact with, the module connection arrangement, so that fluid communication is permitted between the module flow port 26 (see FIGS. 1 and 2) of the central hub 12 and the module inlet port 44 of the module 40. In this example, the module inlet port 44 is positioned on a lower surface of the central module 42, although the skilled reader will appreciate that other configurations are possible, and may depend on the relative position of the module connection arrangement. When the module 40 is positioned on the central hub 12, the module flow port 26 and the module inlet port 44 are aligned to facilitate fluid flow therebetween.

Once connected, the central module 42 and the central hub 12 may define a central axis 46, which has been illustrated for reference. In this example, the center of the module flow port 26 and the module inlet port 44 is aligned with the central axis 46, although the skilled reader will appreciate that other locations of the module inlet port 44 and the module flow port 26 are possible that are not aligned with the central axis 46. Extending from the module inlet port 44, and defined by the central module 42, is a flow path. In this example, the flow path is concentric with the central axis 46, and takes the form of a central bore through the central module 42. The skilled reader that other configurations of flow path are possible, which may vary, for example, depending on the shape of the central module and the location of the module inlet port 44.

Positioned laterally relative to the flow path, and from the central axis 46, are conduit flow ports 48, each of which provide fluid communication between the flow path and an external location. In this case, the conduit flow ports 48 permit fluid communication to a conduit valve arrangement 50, in a similar way to the conduit flow ports 24 providing fluid communication to the conduit valve arrangement 34 of FIGS. 1 and 2. In this example, there are illustrated four conduit flow ports 48, each of which are connected to a corresponding conduit valve arrangement 50. More or fewer conduit flow ports and corresponding conduit valve arrangements 50 may be possible, for example, one, two, three or five.

Each of the conduit valve arrangements 50 comprise a conduit 52 extending radially therefrom. In this example, the conduits have a stepped shape, initially extending from the conduit valve arrangement 50 in a radial direction perpendicular to the central axis 46, before extending in a downward direction, and then finally extending once again in a radial direction. This permits a connection arrangement, e.g., for connecting each conduit 52 to a further conduit or device, to be located substantially coplanar to the header pipe 30 and the conduit 35 as illustrated, and previously described in further detail in relation to FIGS. 1 and 2. Having a substantially coplanar orientation may assist in connection (e.g., the coupling) of the conduits 35, 52 to an external device or conduit. In one example, it may result in less bending and stresses acting on a pipe or conduit connected thereto.

The conduit flow ports 48 and corresponding conduit valve arrangements 50 may have an even circumferential spacing, as shown in this example. The conduit flow ports 48 are here spaced at approximately 90 degrees to one another. The conduit valve arrangements 50 extend from, and are positioned radially outwardly of, conduit flow ports 48.

As illustrated in FIGS. 3 and 4, each of the conduit valve arrangements 50 of the central module 42, and the conduit valve arrangements 34 of the central hub 12 extend radially from the central axis 46, with the conduit valve arrangements 50 of the central module 42 being located above the conduit valve arrangements 34 of the central module 12. As in previous FIGS. 1 and 2, the conduit valve arrangements 34 are positioned at approximately 90 degrees from the header pipe 30. In the configuration shown, the conduit valve arrangements 50 of the central module 42 are circumferentially offset by approximately 45 degrees compared to the conduit valve arrangements 34 of the central module 12. As each of the conduit valve arrangements 50 of the central module 42 are circumferentially spaced at approximately 90 degrees relative to each other, each is also spaced at approximately 45 degrees from the header pipe 30. The configuration shown may provide a plurality of connection points to a centralized location on a header pipe 30, while permitting conduits or devices to be connected thereto without, or with minimized interference between, adjacent devices.

In this example, the conduit valve arrangements are attached (e.g., coupled) to the central module 42, which may be by any appropriate means such as bolting, welding, chemical bonding, or the like.

In common with the conduit valve arrangements 34 of the central hub 12, each of the conduit valve arrangements 50 comprises a valve actuator 54. The valve actuators 54 of the described example are substantially similar to the valve actuators 36 described in relation to FIGS. 1 and 2 in that they are able to be attached to the conduit valve arrangements 50, and in this example are attached to an upper surface thereof. The valve actuators 54 also comprise an actuator extension mechanism 56, permitting linear extension of at least a part of the actuator 54, and the actuator extension mechanism 56 may be a telescopic actuator extension mechanism. As illustrated in FIGS. 3 and 4, the actuator extension 56 mechanism may permit alignment of a portion of each of the valve actuators 54 (e.g., a portion that allows the actuator to be coupled to an actuation device) to lie in an actuator plane. The actuation plane may be the same as that described in relation to FIG. 1. This particular configuration of actuators 54 having actuator extensions may allow the actuators 38 and the actuators 56 to be actuated by a single device, such as an actuation device, which is able to couple to the actuators 38, 56 in the actuation plane.

The central module 42 also comprises a module connection arrangement 45, which may be similar to the module connection arrangement 20 shown on the central hub 12. In this case, the module connection arrangement 45 may be used to connect a further module 42 thereto, which may enable a user to provide the subsea manifold system 10 with additional conduit valve arrangement 50, if required. Such additional valve arrangements 50 may be angularly offset from those already positioned, which may permit ease of actuation of each valve arrangement 50. As depicted, the module connection arrangement 45 is located on an upwardly facing surface of the central hub 12. In this case, the module connection arrangement 45 comprises a port and a means for securing a connected module thereto. However, in other examples, the module connection arrangement 45 may simply comprise a port. The module connection arrangement 45 may optionally comprise a sealing mechanism, to seal a port therein from the external environment. Such a sealing mechanism may be in the form of a plug.

In addition, the module connection arrangement 45 may permit a degree of intervention through the manifold system. For example, the module connection arrangement 45 may permit the introduction of tooling or chemicals therethrough. Tooling such as cabling and/or sensors may be inserted through the module connection arrangement 45, which may be used to perform operations, for example, operations in the header pipe 30, or may be used to asses a quality of a fluid flowing in the header pipe 30.

Figure 6:
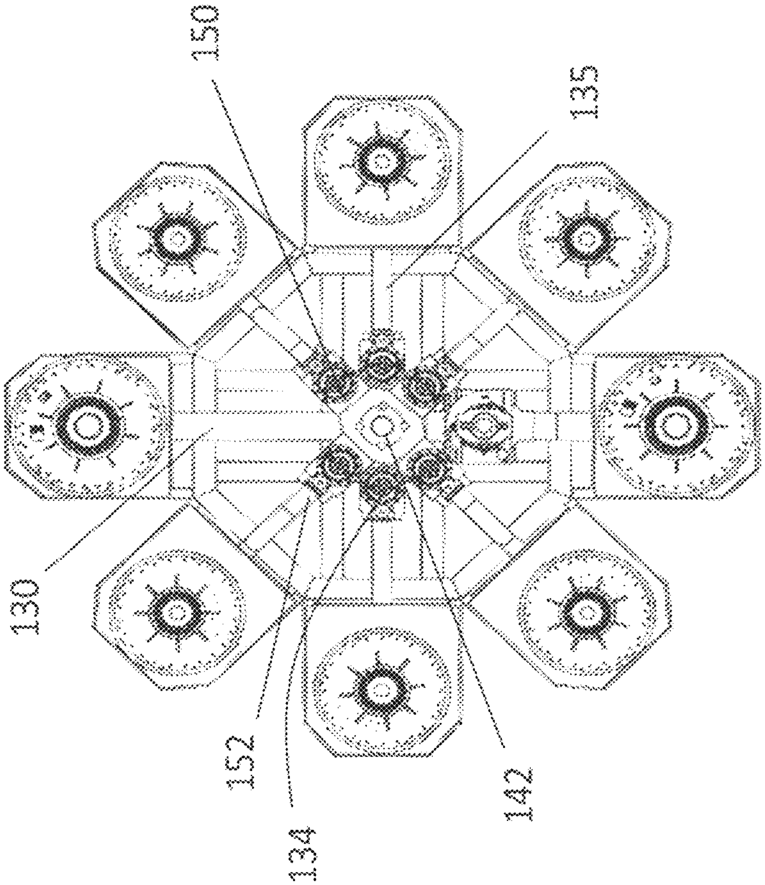
FIG. 6 shows a sectional view of the further adapted version of the example of FIGS. 3 and 4.
Figure 5:
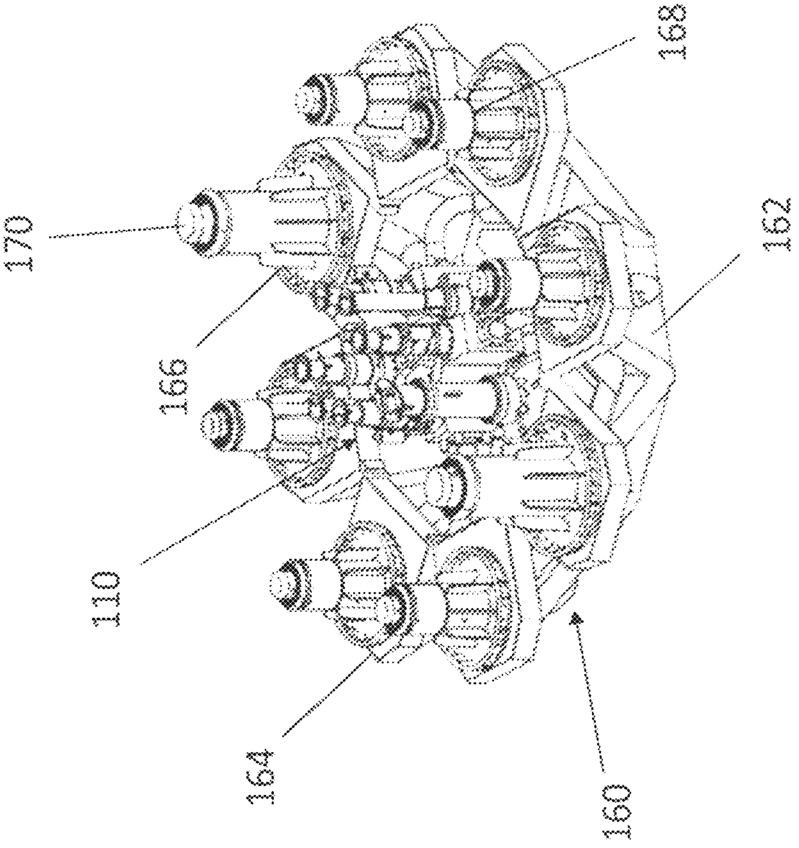
FIG. 5 shows a further adapted version of the example of FIGS. 3 and 4.

FIGS. 5 and 6 illustrate a manifold system 110 which is in many respects is similar to that described in FIGS. 1 to 4. As such, alike reference numerals have been used, augmented by 100.

In common with previously described examples, the manifold system 110 of FIGS. 5 and 6 comprises a header pipe 130 as well as conduits 152 and conduits 135. In this example, a central module 142 is located towards the center of the manifold system 110, and comprises four conduit valve arrangements 150 and two conduit valve arrangements 134. The conduit valve arrangements 134 and corresponding conduits 135 extend radially from the central module, and in this example are circumferentially offset from the header pipe by an angle of 45 degrees. The conduit valve arrangements 150 and corresponding conduits 152 extend radially from the central module 142 circumferentially offset from the header pipe by an angle of 90 degrees.

While angles of 45 and 90 degrees are described above, it should be understood that these values may be an approximation of a more precise angle, which may vary from those stated by several degrees (e.g., one degree, two degrees, five degrees, etc.). Additionally, other circumferential spacings of the conduit valve arrangements 134, 150 and corresponding conduits 135, 152 are possible, as are alternative numbers of such components.

As shown in this example, each of the conduits 135, 152 and the header pipe 150 extend from the manifold system 110 and are connected to a support frame 160. The support frame 160 comprises a main body 162, which supports the manifold system 110, as well as a number of platforms 164, 166, each of which support a conduit connector 168, 170, and may function as a manifold interface for connection of a conduit or external component to the manifold system 110. The platforms 164 are here vertically oriented (i.e., so that a conduit protrudes therefrom in a vertical direction), so that they may be considered to be vertical manifold interfaces. Conduit connectors 168 each support a connection that links a conduit valve arrangement 134, 150 to an external component (e.g. a further conduit or device) via conduit 152. Conduit connectors 170, which may be considered to be header connectors, connect the header pipe 130 to a further component (e.g., a conduit or device). In this example, the header connectors 170 are larger than the conduit connectors 168. Having support frame 160 and platforms 164, 166 may enable each of the connectors 168, 170 to be positioned facing a desired direction. In the example shown, the connectors 168, 170 are facing vertically upwards, although the skilled person will understand that other configurations are possible, for example, the connectors 168 could be configured to face an angle to the horizontal.

In the example of FIGS. 5 and 6, as well as in the previously described examples, the manifold system has a centralized configuration (e.g., taking the form of a star, or a clock) surrounding a single point (e.g., a single module connection arrangement) on the attached header pipe 30, 130. A user may benefit from the described centralized configuration in that it provides a single location at which further conduits and/or equipment may be connected, rather than having to sequentially connect further conduits and/or equipment along the length of the header pipe. In addition, such a configuration may enable the user to operate within a more loosely defined tolerance threshold than in a configuration whereby further conduits and/or equipment are required to be connected along the length of the header pipe. For example in the current configuration, since there are many possible conduit/equipment connection points surrounding a single location, where a connection component (e.g., a conduit or piece of equipment) is too long or too short to connect to one conduit connection point, then it may be of an appropriate length to connect to an adjacent connection point. In contrast, a configuration having multiple single conduit connection points distributed along the length of the header pipe would require much more tightly toleranced equipment.

Figure 8:
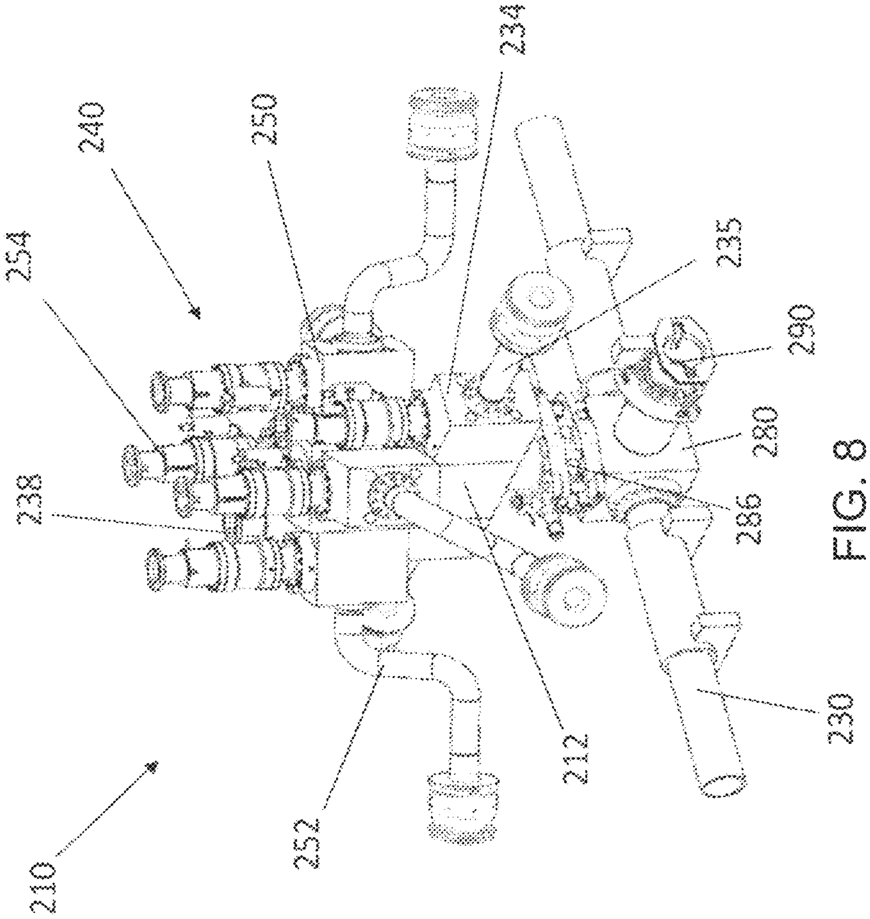
FIG. 8 shows the modular subsea manifold system of FIG. 7 with a module attached thereto in an isometric view.
Figure 7:
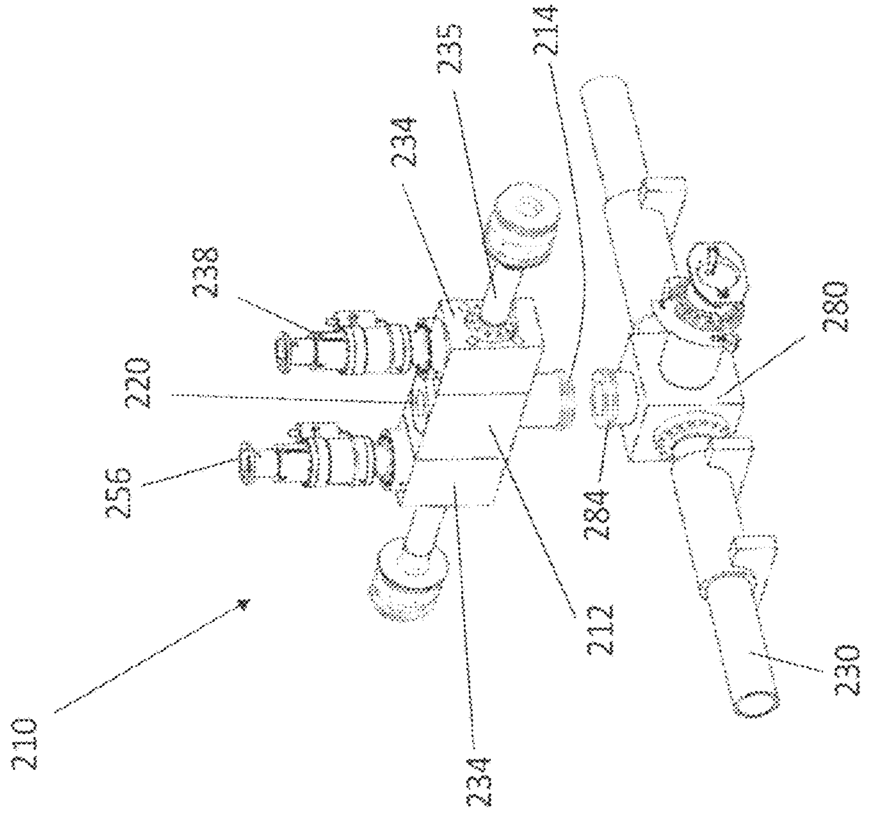
FIG. 7 shows a further example of a modular subsea manifold system in an isometric view.
Figure 9:
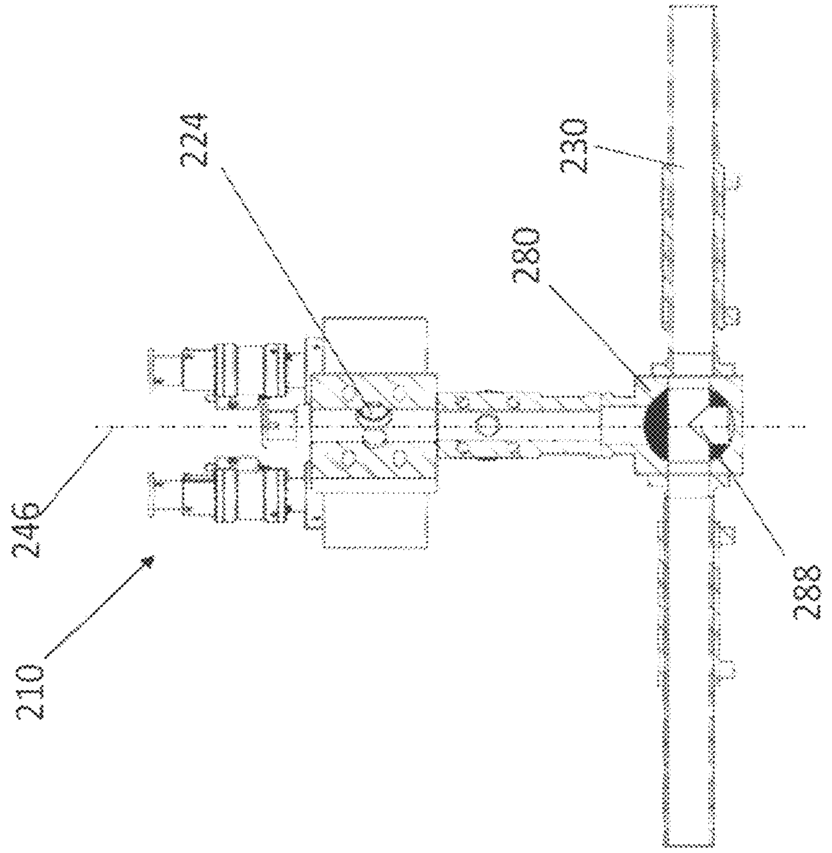
FIG. 9 shows a first sectional view of FIG. 8.

In FIGS. 7, 8 and 9, there is illustrated a further example of a manifold system 210. This example comprises many features in common with that of FIGS. 1 to 4. As such, alike reference numerals have been used, augmented by 200.

In this example, a central hub 212 is shown having a rectangular prism shape. In the orientation shown in the example, two conduit valve arrangements 234 are connected to opposite side faces of the central hub 212. As in previous examples, the valve arrangements 234 are illustrated as being separate from the central hub, although other configurations may be possible such as the valve arrangements 234 being integrally formed with the central hub 212. Partially visible in FIG. 8, and similar to the described FIG. 4, the central hub 212 comprises a central bore extending therethrough, and conduit flow ports 224 (not visible in FIG. 7, see FIG. 8) are located laterally with respect to the central bore. In this example, the central bore is concentric with central axis 246 (see FIGS. 9 and 10). Also similar to previous examples, each of the valve arrangements 234 comprise a valve actuator 238 extending from an upper surface thereof, and a connected conduit 235 extending from a lateral surface thereof. The valve actuator 238 comprises and actuator extension mechanism 256, which enables extension of a portion of the actuator 238 towards an actuation plane, as described in previous examples. In addition a module connection arrangement 220 is located on an upper surface thereof, as was the case in the previously described examples.

In the example of FIG. 7, the central hub 212 comprises a single header pipe connection 214, which is located on a lower surface of the central hub 212. The header pipe connection 214 comprises a section of conduit, extending vertically downwardly from the central hub 212 in this example, and terminating in a connection portion. The connection portion may comprise a lip, rib, groove, indent or other feature for facilitating connection with a header pipe 230.

In contrast to the example shown in FIGS. 1 to 4, this manifold system 210 has a single connection to the header pipe 230. As such, the header pipe 230 comprises a manifold connection module 280, which comprises two connections 282 to the header pipe 230, and one manifold connection 284, which is located on an upper surface of the manifold connection module 280. As such, the manifold system 210 may be connected to the manifold connection module 280 at an upper surface thereof, so that a component of the weight (e.g., some or all) of the manifold system 210 acts upon the manifold connection module 280.

Having a manifold connection module 280 may permit a header pipe 230 with such a module to be installed in a subsea location, and then for the manifold system 210 to be landed on the manifold connection module 280 if and when required. Although in this example the connection module 280 is illustrated as comprising a valve (as will be described), the manifold connection module 280 may simply be a module with a fluid port and connection means, sealed by a pressure cap until it is required to connect the manifold system 210. In such examples, a valve arrangement may be positioned on either side of the manifold connection module 280 so as to permit fluid isolation of the connection module 280 during connection with a manifold system 280. In operation, this configuration may be advantageous, as it may permit an initial larger vessel to be used to install the header pipe 230 in a desired location, and then the manifold system 210 may be subsequently installed using a smaller, less expensive and more easily maneuverable vessel, thereby saving costs and decreasing the complexity of the operation. The manifold system 210 (or a module that is connected to the manifold system) may also be able to be disconnected and retrieved, for example, using such a vessel, and a pressure cap replaced on the connection module 280, such as when the manifold system 210 requires to be replaced, serviced or repaired.

The configuration shown in FIG. 7 may enable the manifold system 210 to be easily connected to the header pipe 230 by simply lowering the manifold system 210 onto the manifold connection module 280. The header pipe connection 214 may be profiled so that it is able to fit inside a receiving profile of the manifold connection 284. Alternatively or additionally, the manifold system 210 may be held in place on the header pipe 230 by a clamping mechanism, or a fastening mechanism (e.g., one comprising screws or bolts). Although not shown in this example, the manifold system 210 may be surrounded by, and optionally supported within, a guide frame. The guide frame may assist to connect the central hub 212 to the manifold connection module 280 by providing, for example, an anchor point for a means for positioning the central hub 212 on the connection module 280.

Although depicted as having a rectangular prism orientation, then skilled person will appreciate that other geometries of the manifold connection module 280 may be possible. For example, the manifold connection module 280 may have a cylindrical shape or an irregular shape, comprising flat surfaces and/or curved surfaces. The manifold connection module 280 may comprise a surface profiled to mate with a correspondingly profiled surface of the central hub 212, which may facilitate engagement between both, and/or may prevent rotation therebetween. As illustrated, the manifold connection module 280 is of a comparable height to the diameter of the header pipe 230. For example, the manifold connection module 280 may have a height of between 1 and 2 times the diameter of the header pipe 230, between 2 and 3 times the height of the diameter of the header pipe 230, between 3 and 4 times the diameter of the header pipe, or the like. Having a manifold connection module 280 having a relatively small diameter may be beneficial, for example, when performing operations on the header pipe 230, and/or on the manifold connection module 280. For example, at times, a tensioner may be required to be run across the header pipe 230. Wherein the manifold connection module 280 has a relatively small height (e.g., a relatively small build height), then such a tensioner may be able to pass over the manifold connection module 280 in the pipe with little or no intervention. Whereas, were the manifold connection module 280 to be larger, this might impede movement of a tensioner along the header pipe 230, thereby resulting in longer and more expensive down time.

In FIG. 8, the manifold system 210 is illustrated with a module 240 attached thereto. FIG. 8 is an analogous example to FIG. 3 described previously. Similar to the previous example, the module 240 is positioned on top of the central hub 212 and comprises four conduit valve arrangements 250 which are offset at 45 degrees relative to the two conduit valve arrangements 234 attached to the central hub 212. In this example, the conduit valve arrangements 234 are offset at 90 degrees relative to the header pipe 230, although the skilled person will understand that in this example, and in the previously described examples, other values of offset may be used, and the values used are not limited to those in the described examples. Further, each of the conduit valve arrangements 234 are offset via rotation about a central axis 246 (see FIGS. 9 and 10). However, additional offset about an alternative axis may be possible, for example, about an axis extending perpendicularly to the central axis 246.

Each of the conduit vale arrangements 234, 250 comprises an actuator 238, 254, mounted on top thereof. Further, the connection module 280 also provides a valve actuator 290. In this example, the valve actuator 290 extends approximately horizontally, and in a direction perpendicular to the axis of the header pipe 230.

As in previous examples, conduits 235 and 252 are arranged so that connection portions thereof are located in a single plane. In this example, and in previous examples, the conduits 252 comprise a stepped portion to achieve this effect. However, it should be understood that instead conduits 235, or both conduits 235, 252, may comprise a stepped portion to achieve the same effect.

In common with the central hub 212, the module 240 additionally comprises a module connection arrangement 220, which in this example is located on an upwardly facing surface thereof. Although not illustrated in FIG. 8, a further module 240 may be connected to the module connection arrangement 220, which may be the same as, or different to, the module 240. As such, further conduit valve arrangements may be incorporated into the manifold system 210 in this way, which may also be angularly offset those illustrated.

As in the previously described examples, the module connection arrangement 45 may permit a degree of intervention through the manifold system 210, for example, by way of introduction of tooling or chemicals therethrough. Optionally, the module connection arrangement 45 may comprise a sealing mechanism to seal a port therein from the external environment. Such a sealing mechanism may be in the form of a plug.

Further illustrated in FIG. 8 is an attachment mechanism 286, for attaching the header pipe connection 214 to the manifold connection 284. As in previously described examples, the attachment mechanism 286 may comprise a fluid port and a means for attaching a further component thereto, or may simply comprise a fluid port (and the means for connection thereto may be located on the object to be connected). As shown in FIGS. 7 and 8, the manifold connection 284 is brought into abutment with the header pipe connection 214. In the example of FIG. 8, a clamping mechanism is used to secure the module 240 to the header pipe 230.

Figure 10:
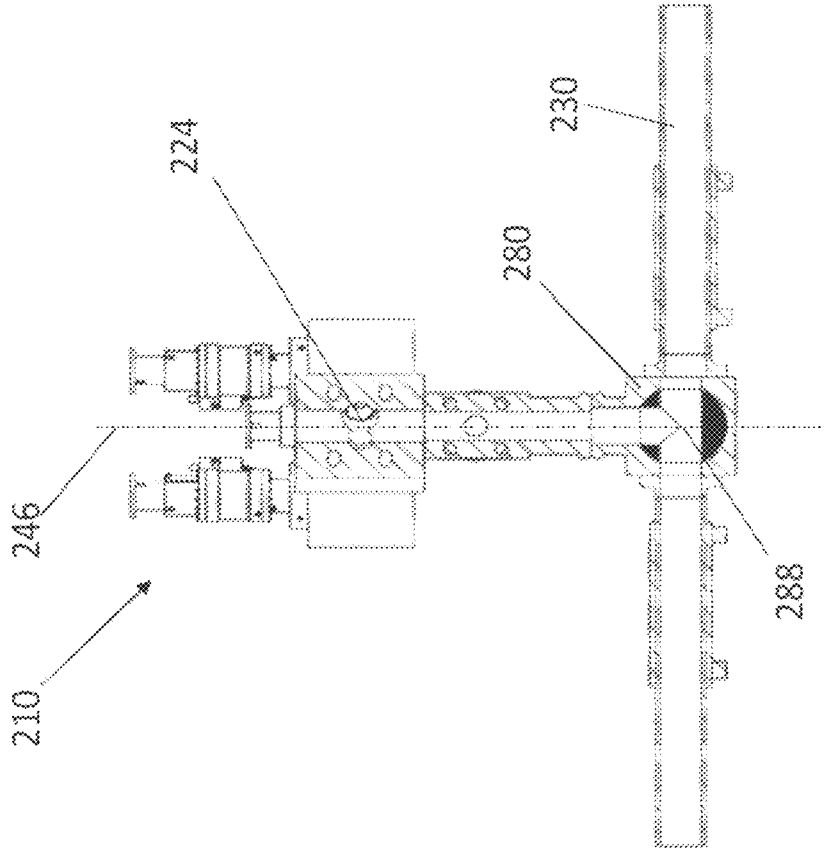
FIG. 10 shows a second sectional view of FIG. 8.

FIGS. 9 and 10 illustrate a cross sectional view of the manifold system 210 shown in FIG. 8. As these figures contain many features in common with previously described figures, for the sake of succinctness, description of identical features will not be repeated. In this view, internal detail of the manifold connection module 280 is shown. The illustration of FIGS. 9 and 10 are similar except that in FIG. 9 there is illustrated a valve 288 in the manifold connection module 280 in a position blocking fluid flow to the central hub 212, whereas in FIG. 10, the valve 288 is an a position that permits fluid flow to the central hub.

As illustrated, the valve 288 located inside the connection module 280 is in the style of a ball valve. The valve 288 may permit fluid flow through the module 280, e.g., from one side of the connected header pipe 230 to the other. The valve 288 may also optionally permit fluid communication from the connection module 280 towards a connected module 240, via manifold connection 284. In the depicted example, the valve 288 is able to be actuated so that in one configuration, a flow path extends from the connection module 280 to the module 240, and in another configuration, the module 240 is isolated from fluid flow in the connection module 280 and the associated header pipe 230. Actuation may be provided by an external actuator 290 (best viewed in FIG. 8), such as by rotation of an external actuator 290.

Using the configuration shown in FIGS. 9 and 10, a user may be able to block flow from the connection module 280 to the manifold system 210, and also permit flow thereto, when required. When flow is blocked to the manifold system is blocked, with the valve 288 in the configuration shown in FIG. 9, disconnection of the manifold system 210 may be possible, in which case a sealing arrangement may be provided directly onto the connection module 280. In practice, connection module 280 and valve 288 may permit a user to have a subsea conduit, such as a header pipe, having a connection module 280 (or having multiple connection modules 280, distributed therealong) that may be held in a closed position until their use is required. This may involve having the valve 288 of the connection module 280 in the closed position (as shown in FIG. 9) for years before requiring configuration of the valve towards the open position (as shown in FIG. 10) for use.

Figure 11:
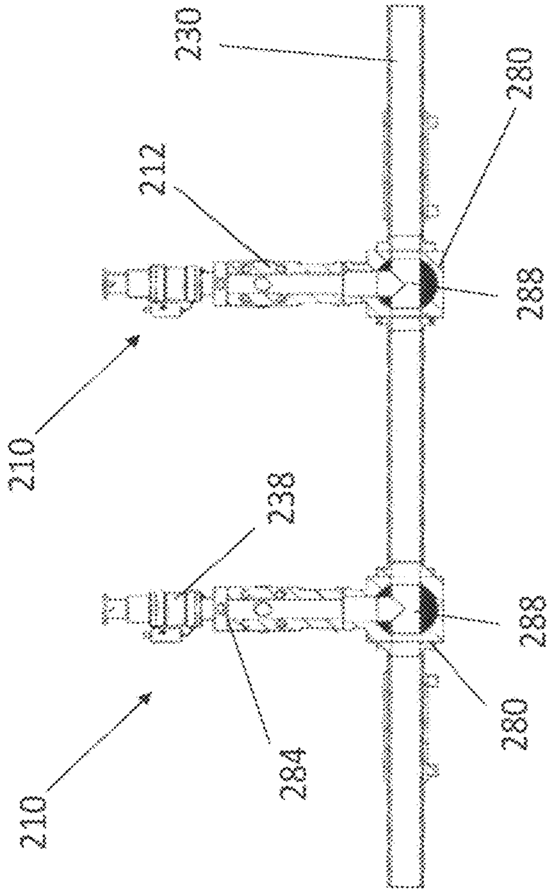
FIG. 11 shows two of the modular subsea manifold systems of FIG. 7 attached to a conduit.

FIG. 11 illustrates two of the modular subsea manifold systems of FIG. 7, attached to a conduit, which may be a header pipe. Here, each of the modular subsea manifold systems 210 are substantially identical, and are connected to a conduit 230 (hereinafter referred to as a header pipe) each via a module 280. As is illustrated, each of the subsea manifold systems 210 comprises a central hub 212 having a conduit valve arrangement protruding therefrom, which comprises a valve actuator 238. Although the manifold connection 284 is shown as being open to the external environment, it may be possible to affix a sealing mechanism thereto. In both cases, the valve 288 is shown in a position so as to permit fluid flow to the manifold system 210. However, as in the previous figures, it may be possible to actuate the valve 288 so as to restrict, or block, fluid flow to either or both of the manifold systems 210.

The subsea manifold systems may be installed on a header pipe 230, or another section of conduit, in a subsea location and remain in place until their use is required, thereby providing easy access to the header pipe/other conduit when required, without having to perform any additional work on said conduit.

Figure 12:
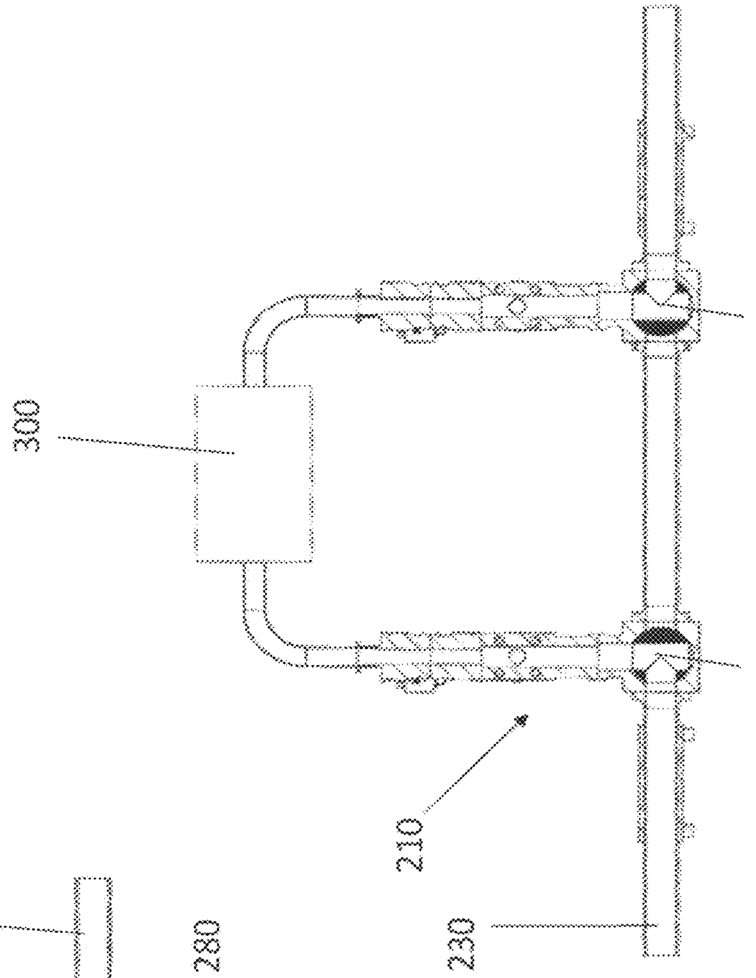
FIG. 12 shows the modular subsea manifold system of FIG. 7 being used in a bypass configuration.
Figure 14:
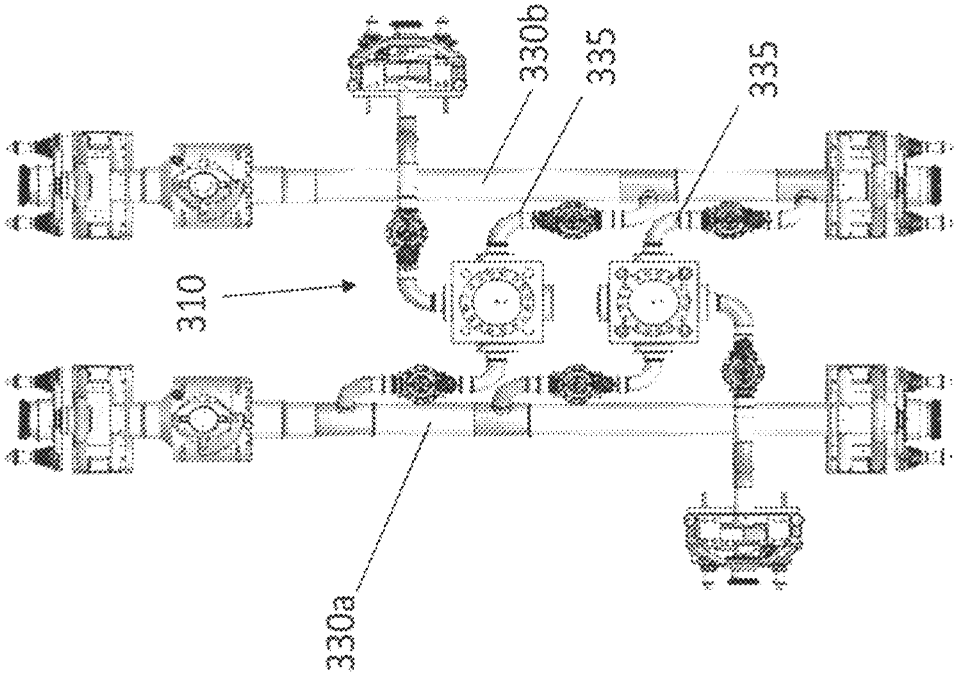
FIG. 14 shows a second arrangement of a modular subsea manifold system in a dual header pipe arrangement.

FIG. 12 illustrates the modular subsea manifold system 210 of FIGS. 8-10 being used in a flow diversion, or bypass, configuration. As shown, both valves 288 of this system 210 are in an intermediate configuration, which permits diversion of flow from the header pipe 230 and towards, for example, a subsea manifold system. As in previous examples, the subsea manifold system 210 comprises a central hub 212 with a conduit valve arrangement protruding therefrom. In addition, each of the subsea manifold systems 210 are connected to a secondary system 300 so that fluid flow is permitted from a first subsea manifold system 210 to a second subsea manifold system 210, and optionally vice versa, before flowing back into the conduit 230. In this way, the connected subsea manifold systems 210 and the secondary system may form a flow diversion arrangement. With the valves in the intermediate position, flow may therefore be blocked, or restricted, from flowing along a section of the conduit 230, and instead by diverted to the flow diversion arrangement.

The secondary system 300 may take many forms. For example, the secondary system may be a chemical injection point, so that a fluid flowing therethrough is able to be chemically treated. The secondary system may be a chemical testing station, enabling a fluid flowing therethrough to be tested for some reason (e.g., for a hydrocarbon composition of the fluid flowing therethrough to be tested, for the presence of sulphates, water content etc. in a hydrocarbon fluid to be tested, etc.). Such a secondary system may additionally comprise a pump, for example, in order to draw the fluids from the conduit 230.

In practice, a user may use the conduit 230 for a long time (e.g., for many years) with the valves 288 positioned to restrict fluid flow externally from the conduit 230 (e.g., as shown in FIG. 9). At some point, it may be necessary to divert at least a portion of the fluid from the conduit 230, for example, to treat the fluid or test some property of the fluid. In this case, a flow diversion arrangement may be connected to a first and a second of the modules 280, and the valves 288 configured to an intermediate position so as to permit fluid flow through the flow diversion arrangement. Once flow diversion is complete, a user may be able to once more reconfigure the valves 288 to a position in which flow of a fluid from the conduit 230 is not permitted, and previous operation of fluid flow in the conduit 230 may continue.

Although not illustrated in any of the described examples, the modular manifold system may be integrated (or at least partially integrated) within a frame or template, also comprising other components and/or equipment. For example, the modular manifold system may be integrated within a frame which, in the subsea environment, may additionally comprise subsea or Christmas tree or wellhead structures. In one case, a modular manifold system may be integrated into a central location on a frame, having multiple (e.g., two, three, four etc.) Christmas trees integrated into the frame around the periphery of the modular manifold system. Such an integrated configuration may assist in providing a connection between the modular manifold system and the other components/equipment that is integrated into the frame or template. For example, the frame may permit a user to have a more accurate knowledge of the length of conduit required to connect a Christmas tree to a modular manifold system.

In an alternative example, the modular manifold system may be positioned in a subsea environment independently of any frame comprising subsea components/equipment such as Christmas trees and wellheads. In this example, it may be possible to connect a Christmas tree to a modular manifold system via a subsea jumper connection.

Figure 13:
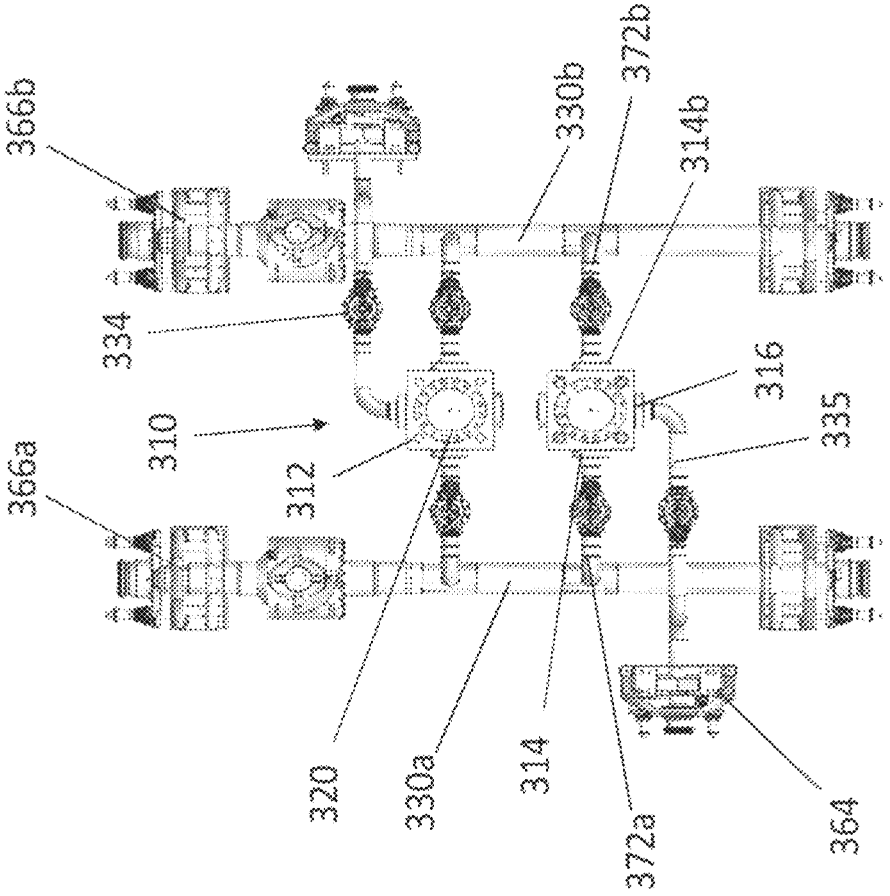
FIG. 13 shows a first arrangement of a modular subsea manifold system in a dual header pipe arrangement.
Figure 16:
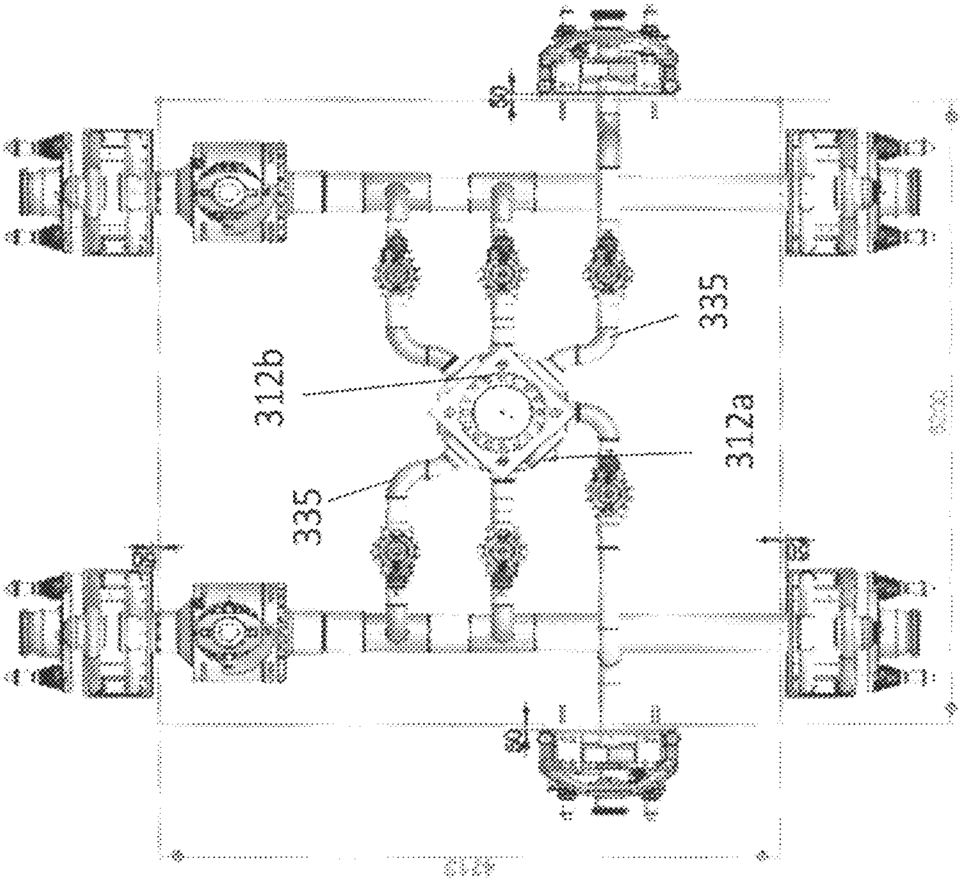
FIG. 16 shows a fourth arrangement of a modular subsea manifold system in a dual header pipe arrangement.

Illustrated in FIGS. 13 to 17 are further examples of a manifold system 310. The examples of FIGS. 13 to 17 illustrate a manifold system 310 being connected to a dual header pipe arrangement 330*a*, 330*b*. In FIG. 13, two manifold systems 310 can be seen, with each being connected to both the first header pipe 330*a* and the second header pipe 330*b* via a first and a second header pipe connection 314*a*, 314*b* on the central hub 312. Each header pipe connection 314*a*, 314*b* is connected to the respective header pipe 330*a*, 330*b* via a header connection conduit 372*a*, 372*b*. Each of the header connection conduits 372*a*, 372*b* comprise an isolation valve therein, which may enable flow therethrough to be either blocked or permitted, thereby permitting each manifold system 310 to be isolated from each header pipe 310*a*, 310*b* if required.

In the example of FIG. 13, each of the central hubs 312 also comprises a conduit connection arrangement 316 with a conduit connected thereto. The conduit connection arrangements 316 each have a conduit 335 connected thereto, with each conduit 335 comprising a conduit valve arrangement 334, which may either permit or restrict (e.g., block) flow through the conduit 335. The conduit 335 connects the conduit connection arrangement 316 to a manifold interface 364, which may permit connection of an external component or conduit to the manifold system 310. As the conduit valve arrangement 334 (which may be an isolation valve) is positioned between the manifold interface 364 and the central hub 312, the conduit valve arrangement 334 may be used to selectively permit or restrict flow between manifold interface 364 and the central hub 312. The conduit 335 extends from the central hub in a direction perpendicular to the longitudinal direction of the header pipes 330*a*, 330*b*, and extends above the header pipes 330*a*, 330*b* so that the manifold interface is located adjacent to one of the header pipes 330*a*. 330*b* and on the opposite side of the header pipe compared to the central hub 312. This configuration may provide ease of access to the manifold interface 364, and ease of fluid communication with the central hub 312, which may be located between the header pipes 330*a*, 330*b* so as to reduce the space required, or more efficiently use available space, when positioning the manifold system 310.

In contrast to previous examples (see FIG. 5, for example), where the manifold interface 364 was vertically oriented, in this example, the manifold interface is horizontally oriented (i.e., oriented so that a conduit protrudes therefrom in a horizontal direction), although it should be understood that in other examples, a vertically oriented manifold interface may be used.

Similar to previously described examples, each of the header pipes 330*a*, 330*b* comprises a header interface 366*a*, 366*b* which may be used to connect the header pipes 330*a*, 330*b* to a subsea piping system.

Although in the example of FIG. 13 no module is connected, each of the central hubs 312 comprises a module connection arrangement 320, which in this example is located on an upwardly facing surface of the central hub 312. As such, a user may be able to land a module onto the central hub 312, and connect the module to the module connection arrangement 320. The module connection arrangement 320 may be considered to be, or be part of, a module communication means, which may comprise connection means (e.g., stab-in connection means, bolted or threaded connection means, for example) and may comprise a fluid port to permit fluid communication between a connected module and the central hub 312.

A dual header pipe arrangement may be required for various reasons, for example, in cases where fluid is being produced or injected at different pressures, or where the pressure of produced/injected fluid is too high to be held in one header pipe. In operation, the manifold system 310 may be used in combination with a dual header system to provide a user the ability to access fluid flow in multiple header pipes, and may assist in production thereof, or injection of a fluid thereto. The conduit valve arrangement 334 may be operated in order to permit fluid communication between the manifold system and either or both of the header pipes 330*a*, 330*b*, which may permit a user a high degree of control over production and injection of a fluid using the manifold system 310.

FIGS. 14 to 17 illustrate various alternative configurations of the manifold system 310 of FIG. 13. For example, in FIG. 14, two central hubs 312 are illustrated, each with two conduits 335 extending therefrom. As in previous examples, each of the conduits comprises a valve therein. However, rather than the conduits 335 extending largely perpendicular to the header pipes 330*a*, 330*b*, the largest portion of each of the conduits extends parallel to the header pipes 330*a*, 330*b*. This configuration permits the header pipes 330*a*, 330*b* to be arranged closer together, and the manifold system 320 has a more compact arrangement than in FIG. 13. In some circumstances, such an arrangement may be considered to use space more efficiently than the arrangement of FIG. 13. Other such similar arrangements are also possible, such as that illustrated in FIG. 15.

Figure 15:
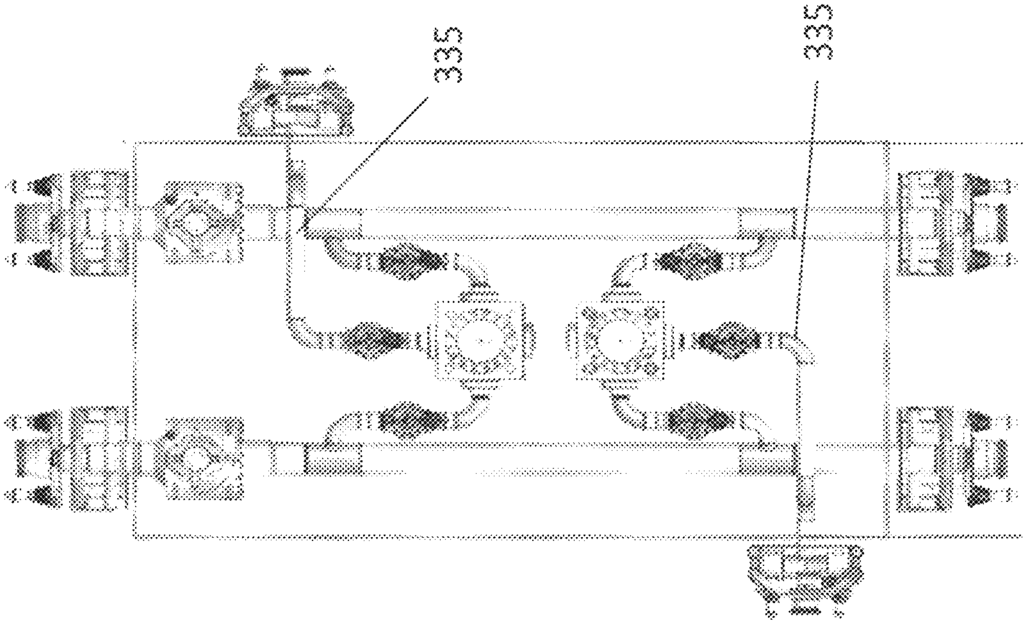
FIG. 15 shows a third arrangement of a modular subsea manifold system in a dual header pipe arrangement.
Figure 17:
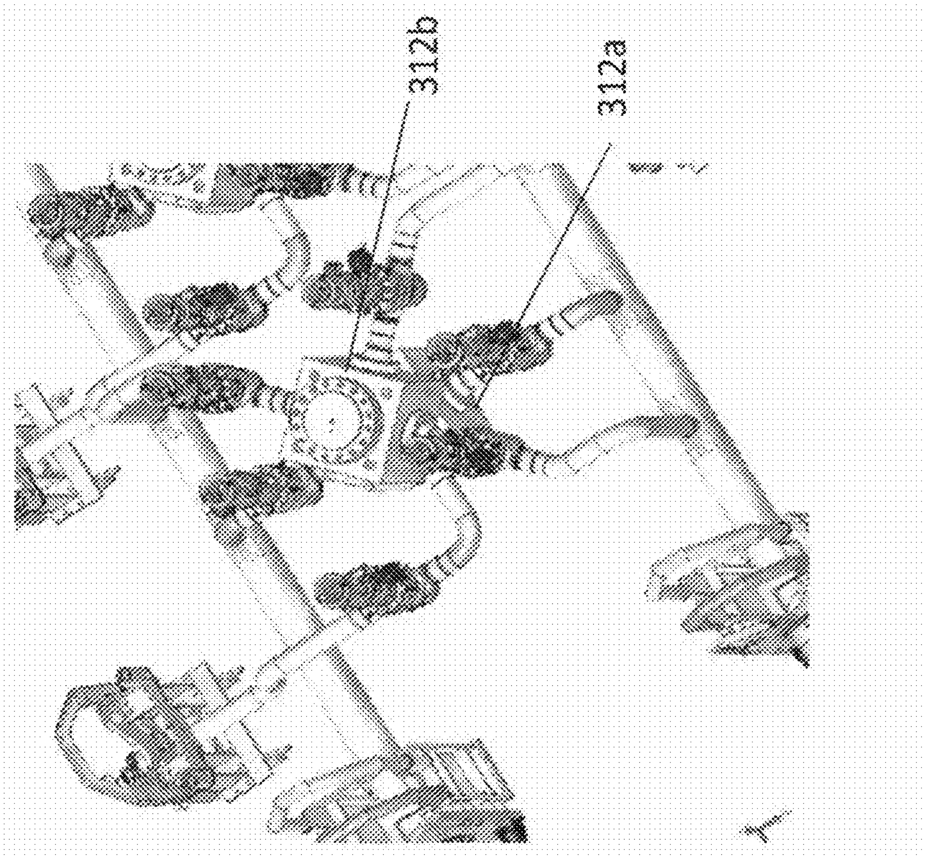
FIG. 17 shows a fifth arrangement of a modular subsea manifold system in a dual header pipe arrangement.

In FIGS. 15 and 17, a manifold system is illustrated in which there are two central hubs 312*a*, 312*b* (in common with the previous examples), in which a second central hub 312*b* is stacked on top of a first central hub 312*a*. Each of the central hubs 312*a*, 312*b* comprises a connection to the first header pipe 330*a* and to the second header pipe 330*b*, and as such, each header pipe comprises two connections to a central hub 312*a*, 312*b*, in common with previous examples. However, in this example, the stacking of one central hub 312*a* on top of another 312*b* further permits a user to save space. In this example, the central hubs 312*a*, 312*b* are not themselves in fluid communication, although due to their proximity it may be relatively simple to fluidly connect the first central hub 312*a* to the second 312*b*. Similar to previous examples, the central hub 312*b* is illustrated with a module connection arrangement for optional connection of a module thereto.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

The subject matter described above may additionally be summarized in the following numbered clauses.

Clauses

CLAUSE A1. A manifold arrangement (10, 110, 210, 310) for connection to a header pipe (30, 130, 230, 330), comprising:

- a central hub (12, 212) comprising header communication means (14, 214) for fluid communication with a header pipe (30, 130, 230. 330), module communication means (20, 220) configurable to provide fluid communication with a disconnectable module (40, 240) and manifold interface communication means (16, 216) configurable to provide fluid communication with a manifold interface (164, 168, 364);
- the central hub (12, 212) comprising a manifold flowpath extending between the header communication means (14, 214) and the manifold interface communication means (16, 216), and a module flowpath extending between the header communication means (14, 214) and the module communication means (20, 220); and
- wherein the module communication means (20, 220) permits connection and disconnection of a module (40, 240) thereto so as to maintain fluid communication at the header communication means (14, 214).

CLAUSE A2. The manifold arrangement (10, 110, 210, 310) of clause A1, wherein the central hub (12, 212) defines the manifold flowpath and the module flowpath.

CLAUSE A3. The manifold arrangement (10, 110, 210, 310) of clause A1 or A2, wherein the header communication means (14, 214) comprises a fluid port configurable to permit fluid flow into the header pipe (30, 130, 230, 330) or from the header pipe (30, 130, 230, 330).

CLAUSE A4. The manifold arrangement (10, 110, 210, 310) of clause A1 or A2, wherein the header communication (14, 214) means comprises an inflow fluid port for fluid flow into the central hub (12, 212) from a header pipe (30, 130, 230. 330) and an outflow port for fluid flow out of the central hub (12, 212) to a header pipe (30, 130, 230. 330).

CLAUSE A5. The manifold arrangement (10, 110, 210, 310) of any of clauses A1 to A4, wherein the module connection means (20, 220) permits connection and disconnection of a module (40, 240) thereto while maintaining a fluid flow in the manifold flow path.

CLAUSE A6. The manifold arrangement (10, 110, 210, 310) of any of clauses A1 to A5, comprising a module (40, 240) connected to the central hub (20, 220) and in fluid communication with the module communication means (20, 220).

CLAUSE A7. The manifold arrangement (10, 110, 210, 310) of clause A6, wherein the connected module (40, 240) comprises a conduit connected thereto, the conduit comprising a manifold interface.

CLAUSE A8. The manifold arrangement (10, 110, 210, 310) of any of clauses A1 to A7, wherein each of the header communication means (14, 214), the module communication means (20, 220) and the manifold interface communication means (16, 216) comprise a fluid port.

CLAUSE A9. The manifold arrangement (10, 110, 210, 310) of any of clauses A1 to A8, wherein the manifold interface communication means (16, 216) of the central hub (12, 212) permits fluid communication between the central hub (12, 212) and a first manifold interface, and between the central hub (12, 212) and a second manifold interface.

CLAUSE A10. A method for establishing fluid flow between a manifold arrangement (10, 110, 210, 310) and a header pipe (30, 130, 230, 330), comprising:

- providing a header pipe (30, 130, 230, 330) for connection of the manifold arrangement (10, 110, 210, 310) thereto;
- connecting the manifold arrangement (10, 110, 210, 310) to the header pipe (30, 130, 230, 330), and establishing fluid communication between a central hub (12, 212) of the manifold arrangement (10, 110, 210, 310) and the header pipe (30, 130, 230, 330);
- establishing fluid communication between a manifold interface and the header pipe (30, 130, 230, 330) via a manifold flowpath in the central hub (12, 212); and
- establishing fluid communication between a module communication means (20, 220) and the header pipe (30, 130, 230, 330) via a module flowpath in the central hub (12, 212), while maintaining fluid communication between the central hub (12, 212) and the header pipe (30, 130, 230, 330).

CLAUSE A11. The method of any of clauses A10 comprising connecting a disconnectable module (40, 240) at the module communication means (16, 216) and providing a fluid flow between the disconnectable module (40, 240) and the header pipe (30, 130, 230, 330), and providing a fluid flow between the manifold interface and the header pipe (30, 130, 230, 330).

CLAUSE A12. The method of clause A10 or A11 comprising providing the fluid flow from the disconnectable module (40, 240) to the header pipe (30, 130, 230, 330), and providing the flow from the manifold interface to the header pipe (30, 130, 230, 330).

CLAUSE A13. The method of any of clauses A10 to A12 comprising providing the fluid flow from the header pipe (30, 130, 230, 330) to the disconnectable module (40, 240), and providing the fluid flow from the header pipe (30, 130, 230, 330) to the manifold interface.

CLAUSE A14. The method of any of clauses A10 to A13 comprising disconnecting a disconnectable module (40, 240) from the module communication means (16, 216) while maintaining fluid flow between the manifold interface and the header pipe (30, 130, 230, 330).

CLAUSE A15. A manifold arrangement (10, 110, 210, 310) for connection to a dual header pipe arrangement, comprising:

the manifold arrangement (10, 110, 210, 310) of clause A1, wherein the header communication means (14, 214) is configured to be in fluid communication with a first and a second header pipe (330*a*, 330*b*).

CLAUSE A16. The manifold arrangement (10, 110, 210, 310) of clause A15, comprising a first central hub (312) and a second central hub (312), each of the first central hub and the second central hub (312) comprising a first header communication means (372*a*) for fluid communication with the first header pipe (330*a*), and a second header communication means (372*b*) for fluid communication with the second header pipe (330*b*).

CLAUSE A17. The manifold arrangement (10, 110, 210, 310) of clause A16, wherein the second central hub (312) is stacked on the first central hub (312).

CLAUSE A18. The manifold arrangement (10, 110, 210, 310) of any of clauses A15 or A17, the header communication means comprising a first header conduit (372*a*) extending between the central hub (312) and first header pipe (330*a*) and a second header conduit (372*a*) extending between the central hub (312) and the second header pipe (330*b*), wherein the mid-section of the first header conduit (372*a*) and the mid-section of the second header conduit (372*a*) are parallel to the respective first and second header pipe (330*a*, 330*b*).

LIST OF REFERENCE NUMERALS

10 (Modular subsea) Manifold system
12 Central hub
14 Header pipe connection
16 Conduit connection arrangement
18 Flow path
20 Module connection arrangement
22 Header flow port
24 Conduit flow port
25 Header valve
26 Module flow port
27 Actuator
28 Header axis
30 Header pipe
32 Connection arrangement
34 Conduit valve arrangement
35 Conduit
36 Actuator/Valve actuator
38 Actuator extension mechanism
40 Module
42 Central module
44 Module inlet port
45 Module connection arrangement
46 Central axis
48 Conduit flow port
50 Conduit valve arrangement
52 Conduit
54 Actuator
56 Actuator extension mechanism
110 (Modular subsea) Manifold system
130 Header pipe
134 Conduit valve arrangements
135 Conduit
142 Central module
150 Conduit valve arrangements
152 Conduit
160 Support frame
162 Main body
164 Platform
166 Platform
168 Connector
210 (Modular subsea) Manifold system
212 Central hub
214 Header pipe connection
216 Conduit connection arrangement
220 Module connection arrangement
224 Conduit flow port
230 Header pipe
234 Conduit valve arrangement
235 Conduit
238 Actuator
240 Module
246 Central axis
250 Conduit valve arrangement
252 Conduit
254 Actuator
256 Actuator extension mechanism
280 Manifold connection module
284 Manifold connection
286 Attachment mechanism
288 Valve
290 Valve actuator/External actuator
300 Secondary system
310 (Modular subsea) Manifold system
312, 312*a*, 312*b* Central hub
314*a*, 314*b* Header pipe connection
316 Conduit connection arrangement
320 Module connection arrangement
330*a*, 330*b* Header pipe/Dual header pipe arrangement
334 Conduit valve arrangement
335 Conduit
364 Manifold interface
366*a*, 366*b* Header interface
372*a*, 372*b* Header connection conduit

What is claimed is:

1. A modular manifold system for connection to a header pipe, the modular manifold system comprising:

a central hub comprising a header pipe connection, the header pipe connection defining a flow port which permits a fluid communication between the header pipe and the central hub;

a conduit connection arrangement arranged on the central hub, the conduit connection arrangement being configured to have a conduit be connected thereto and defining a flow port which permits a fluid communication between the central hub and the conduit connected to the conduit connection arrangement; and a module connection arrangement arranged on the central hub, the module connection arrangement defining a flow port which permits a fluid communication between the central hub and a connected module, wherein the connected module comprises three or more flow ports arranged circumferentially around a center of the connected module configured to fluidly couple the connected module to three or more external components, the connected module and the central hub define a central flow path extending therethrough, the three or more flow ports of the connected module are positioned laterally about the central flow path and are configured to fluidly couple the central flow path to the three or more external components, wherein the three or more flow ports are arranged directly downstream of the central flow path.

2. The modular manifold system as recited in claim 1, wherein the modular manifold system is configured to be connected to the header pipe so that the module connection arrangement is located above the conduit connection arrangement.

3. The modular manifold system as recited in claim 2, wherein, the connected module is connected to the module connection arrangement, and a component of a weight of the connected module acts in a direction of the module connection arrangement.

4. The modular manifold system as recited in claim 3, wherein the connected module comprises a further conduit connection arrangement which is in a fluid communication with the flow port of the module connection arrangement.

5. The modular manifold system as recited in claim 3, wherein the connected module comprises a plurality of further conduit connection arrangements defining the three or more flow ports which are each arranged so as to have an even circumferential spacing around the center of the connected module.

6. The modular manifold system as recited in claim 1, wherein the central hub further comprises a further header pipe connection so as to comprise two header pipe connections, a first one of the two header pipe connections being configurable as a fluid inlet, and a second one of the two header pipe connections being configurable as a fluid outlet.

7. The modular manifold system as recited in claim 1, wherein the central hub further comprises a further conduit connection arrangement so that two conduit connection arrangements are arranged on the central hub.

8. The modular manifold system as recited in claim 7, wherein the two conduit connection arrangements are each arranged so as to have an even circumferential spacing about the center of the connected module.

9. The modular manifold system as recited in claim 8, wherein the two conduit connection arrangements are arranged so as to be circumferentially spaced 180 degrees from one another.

10. The modular manifold system as recited in claim 5, wherein, the connected module and the central hub define the central flow path concentric with a central axis extending therethrough, an axis of the flow port of the module connection arrangement is parallel to the central axis, and axes of the three or more flow ports of the plurality of further conduit connection arrangements are each arranged at a right angle to the central axis.

11. The modular manifold system as recited in claim 10, wherein, the plurality of further conduit arrangements of the connected module comprises four further conduit connection arrangements which are arranged so as to be circumferentially evenly spaced about the central axis, the central hub comprises the conduit connection arrangement and at least one additional conduit connection arrangement which are arranged so as to be circumferentially evenly spaced about the central axis, and at least one of the plurality of further conduit connection arrangements is offset by 45 degrees relative to the conduit connection arrangement or the at least one additional conduit connection arrangement.

12. The modular manifold system as recited in claim 1, wherein, the header pipe connection comprises a header valve for controlling a fluid flow therethrough, and the conduit connection arrangement comprises a conduit valve for controlling a fluid flow therethrough.

13. The modular manifold system as recited in claim 12, wherein, the connected module is connected to the module connection arrangement, the connected module comprising a further conduit connection arrangement, and the further conduit connection arrangement comprises a module valve for controlling a fluid flow therethrough.

14. The modular manifold system as recited in claim 13, wherein each of the header valve, the conduit valve, and the module valve comprise an actuator arrangement, each of which is configured to be extendable from the header valve, the conduit valve, and the module valve, respectively, towards an actuator plane.

15. The modular manifold system as recited in claim 14, wherein each actuator arrangement is extendable telescopically towards the actuator plane.

16. A method for installing a modular manifold system on a header pipe, the method comprising:

providing the header pipe for connection of the modular manifold system thereto, the header pipe comprising a manifold connection point;

providing the modular manifold system comprising a central hub, the central hub comprising, a header pipe connection for connection to the manifold connection point on the header pipe, a conduit connection arrangement for connection of a conduit thereto, the conduit connection arrangement defining a flow port which permits a fluid communication between the central hub and a connected conduit, at least one additional conduit connection arrangement for connection of at least one additional conduit thereto, wherein the conduit connection arrangement and the at least one additional conduit connection arrangement are arranged so as to be circumferentially evenly spaced around a center of the central hub, and a module connection arrangement which defines a flow port which permits a fluid communication between the central hub and a connected module, wherein the connected module comprises three or more flow ports arranged circumferentially around a center of the connected module configured to fluidly couple the connected module to three or more external components, the connected module comprises a plurality of further conduit connection arrangements defining the three or more flow ports, and the plurality of further conduit connection arrangements are arranged so as to be circumferentially evenly spaced about the center of the connected module and angularly offset relative to the conduit connection arrangement or the at least one additional conduit connection arrangement;

connecting the header pipe to the header pipe connection of the modular manifold system; and orienting the modular manifold system so that the module connection arrangement is located above the conduit connection arrangement.

17. A modular manifold system for connection to a header pipe, the modular manifold system comprising:

a central hub comprising a header pipe connection, the header pipe connection defining a flow port which permits a fluid communication between the header pipe and the central hub, wherein the header pipe connection comprises a header valve for controlling a fluid flow therethrough;

a conduit connection arrangement arranged on the central hub, the conduit connection arrangement being configured to have a conduit be connected thereto and defining a flow port which permits a fluid communication between the central hub and the conduit connected to the conduit connection arrangement, wherein the conduit connection arrangement comprises a conduit valve for controlling a fluid flow therethrough; and a module connection arrangement arranged on the central hub, the module connection arrangement defining a flow port which permits a fluid communication between the central hub and a connected module, wherein the connected module comprises three or more flow ports arranged circumferentially around a center of the connected module configured to fluidly couple the connected module to three or more external components, the connected module comprises a further conduit connection arrangement comprising a module valve for controlling a fluid flow therethrough, and each of the header valve, the conduit valve, and the module valve comprise an actuator arrangement, each of which is configured to be extendable from the header valve, the conduit valve, and the module valve, respectively, towards an actuator plane.

18. The modular manifold system as recited in claim 17, wherein each actuator arrangement is extendable telescopically towards the actuator plane.

19. The modular manifold system as recited in claim 17, wherein the modular manifold system is configured to be connected to the header pipe so that the module connection arrangement is located above the conduit connection arrangement.

20. The modular manifold system as recited in claim 19, wherein the connected module comprises a further conduit connection arrangement which is in a fluid communication with the flow port of the module connection arrangement.

21. The modular manifold system as recited in claim 19, wherein the connected module comprises a plurality of further conduit connection arrangements defining the three or more flow ports which are each arranged so as to have an even circumferential spacing around the center of the connected module.

22. The modular manifold system as recited in claim 21, wherein, the connected module and the central hub define a central axis extending therethrough, an axis of the flow port of the module connection arrangement is parallel to the central axis, and axes of the three or more flow ports of the plurality of further conduit connection arrangements are each arranged at a right angle to the central axis.

23. The modular manifold system as recited in claim 22, wherein, the plurality of further conduit connection arrangements of the connected module comprises four further conduit connection arrangements which are arranged so as to be circumferentially evenly spaced about the central axis, the central hub comprises the conduit connection arrangement and at least one additional conduit connection arrangement which are arranged so as to be circumferentially evenly spaced about the central axis, and at least one of the plurality of further conduit connection arrangements is angularly offset relative to the conduit connection arrangement or the at least one additional conduit connection arrangement.

24. The modular manifold system as recited in claim 17, wherein the central hub further comprises a further header pipe connection so as to comprise two header pipe connections, a first one of the two header pipe connections being configurable as a fluid inlet, and a second one of the two header pipe connections being configurable as a fluid outlet.

* * * * *